US012579885B2

(12) United States Patent
Gune et al.

(10) Patent No.: US 12,579,885 B2
(45) Date of Patent: Mar. 17, 2026

(54) AUTOMATIC LIGHT DISTRIBUTION SYSTEM

(71) Applicant: QUALCOMM Incorporated, San Diego, CA (US)

(72) Inventors: Abhijeet Shrikrishna Gune, Frankfurt am Main (DE); Srujith Reddy Katamreddy, Ingolstadt (DE)

(73) Assignee: QUALCOMM Incorporated, San Deigo, CA (US)

( * ) Notice: Subject to any disclaimer, the term of this patent is extended or adjusted under 35 U.S.C. 154(b) by 286 days.

(21) Appl. No.: 18/453,621

(22) Filed: Aug. 22, 2023

(65) Prior Publication Data

US 2025/0069496 A1 Feb. 27, 2025

(51) Int. Cl.
*G08G 1/01* (2006.01)
*G08G 1/07* (2006.01)

(52) U.S. Cl.
CPC ............. *G08G 1/0116* (2013.01); *G08G 1/07* (2013.01)

(58) Field of Classification Search
CPC ............................... G08G 1/0116; G08G 1/07
USPC ........................................................... 701/117
See application file for complete search history.

(56) References Cited

U.S. PATENT DOCUMENTS 7,131,754 B2 * 11/2006 Schofield ............. G06V 20/584 362/276
9,313,862 B1 * 4/2016 Helton ................... G08G 1/163
9,637,047 B2 * 5/2017 Meisner ............... G06V 10/141
9,731,645 B1 * 8/2017 Taleb-Bendiab ... H05B 47/1965
10,696,222 B1 * 6/2020 Pandit .................... G06Q 50/40
11,198,386 B2 * 12/2021 Mulligan ............... G08G 1/012
11,603,033 B2 * 3/2023 Mizuno .................. B60Q 1/143
12,005,833 B2 * 6/2024 Monteuuis ............. G08G 1/163
2003/0137849 A1 * 7/2003 Alden .................... B60Q 1/085 362/276
2013/0131921 A1 * 5/2013 Uhlmann ......... G08G 1/096844 348/148
2016/0167567 A1 * 6/2016 Foltin .................... B60Q 1/143 315/82
2020/0001774 A1 * 1/2020 Kim .......................... G06T 7/70
2021/0146821 A1 * 5/2021 Yoon ...................... G06V 20/20

(Continued)

FOREIGN PATENT DOCUMENTS

FR 3122800 A1 11/2022

OTHER PUBLICATIONS

International Search Report and Written Opinion—PCT/US2024/036263—ISA/EPO—Oct. 16, 2024.

*Primary Examiner* — Luis A Martinez Borrero
(74) *Attorney, Agent, or Firm* — Thien T. Nguyen

(57) ABSTRACT

Aspects presented herein may enable a roadside unit (RSU) or a set of RSUs to assist vehicles to control their headlights, such as switching between high beam(s) and low beam(s) or adjusting the brightness, intensity, and/or range of their headlight beam(s) to improve road safety. In one aspect, an RSU receives at least one of a first message that includes first information associated with a first vehicle or a second message that includes second information associated with a second vehicle. The RSU transmits, based on at least one of the first message or the second message, an indication to modify at least one of a first set of parameters associated with a first lighting system at the first vehicle or a second set of parameters associated with a second lighting system at the second vehicle.

30 Claims, 19 Drawing Sheets

(56) References Cited

U.S. PATENT DOCUMENTS

| | | | | |
|---|---|---|---|---|
| 2021/0213873 | A1* | 7/2021 | Martin | B60Q 1/143 |
| 2022/0141450 | A1* | 5/2022 | Pieper | G06T 7/0002<br>348/148 |
| 2022/0262247 | A1 | 8/2022 | Gao et al. | |
| 2023/0015287 | A1 | 1/2023 | Sui et al. | |
| 2023/0282109 | A1* | 9/2023 | Monteuuis | G08G 1/096791 |
| 2023/0298198 | A1* | 9/2023 | Cserna | B60W 40/02 |
| 2023/0354002 | A1* | 11/2023 | Shuman | G08G 1/096725 |
| 2024/0101018 | A1* | 3/2024 | Monteuuis | G08G 1/096791 |
| 2024/0157969 | A1* | 5/2024 | Nowak | G08G 1/0133 |
| 2024/0212502 | A1* | 6/2024 | Herbert | G08G 1/123 |

* cited by examiner

600

```
BSMcoreData ::= SEQUENCE {
   msgCnt        MsgCount,
   id            TemporaryID,
   secMark       DSecond,
   lat           Latitude,
   long          Longitude,
   elev          Elevation,
   accuracy      PositionalAccuracy,
   transmission  TransmissionState,
   speed         Speed,
   heading       Heading,
   angle         SteeringWheelAngle,
   accelSet      AccelerationSet4Way,
   brakes        BrakeSystemStatus,
   size          VehicleSize
   }
```

FIG. 6

700

```
VehicleType ::= ENUMERATED {
  none                    (0),  -- Not Equipped, Not known or unavailable
  unknown                 (1),  -- Does not fit any other category
  special                 (2),  -- Special use
  moto                    (3),  -- Motorcycle
  car                     (4),  -- Passenger car
  carOther                (5),  -- Four tire single units
  bus                     (6),  -- Buses
  axleCnt2                (7),  -- Two axle, six tire single units
  axleCnt3                (8),  -- Three axle, single units
  axleCnt4                (9),  -- Four or more axle, single unit
  axleCnt4Trailer         (10), -- Four or less axle, single trailer
  axleCnt5Trailer         (11), -- Five or less axle, single trailer
  axleCnt6Trailer         (12), -- Six or more axle, single trailer
  axleCnt5MultiTrailer    (13), -- Five or less axle, multi-trailer
  axleCnt6MultiTrailer    (14), -- Six axle, multi-trailer
  axleCnt7MultiTrailer    (15), -- Seven or more axle, multi-trailer
  ...
}
```

FIG. 7

800

Example Information Elements (IEs) of a basic safety message (BSM) associated with vehicle exterior lights

```
ExteriorLights ::= BIT STRING {
   -- All lights off is indicated by no bits set
   lowBeamHeadlightsOn        (0),
   highBeamHeadlightsOn       (1),
   leftTurnSignalOn           (2),
   rightTurnSignalOn          (3),
   hazardSignalOn             (4),
   automaticLightControlOn    (5),
   daytimeRunningLightsOn     (6),
   fogLightOn                 (7),
   parkingLightsOn            (8),
   HeadLightsRangeAdjustment  (9)   OPTIONAL
   } (SIZE (10, ...))
```

FIG. 8

AUTOMATIC LIGHT DISTRIBUTION SYSTEM

TECHNICAL FIELD

The present disclosure relates generally to communication systems, and more particularly, to a wireless communication involving road safety.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In some scenarios, when vehicles are travelling in proximity to each other or are approaching each other and at least one of the vehicles is using inappropriate intensity/range of headlight beam(s) (e.g., using high beam(s)), that vehicle may blind the drivers of other vehicles, which may cause road safety concerns for nearby drivers. As such, aspects presented herein may improve road safety by enabling vehicles to perform automatic light distribution based on vehicle-to-everything (V2X)/cellular vehicle-to-everything (C-V2X) (V2X/C-V2X).

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives at least one of a first message that includes first information associated with a first vehicle or a second message that includes second information associated with a second vehicle. The apparatus transmits, based on at least one of the first message or the second message, an indication to modify at least one of a first set of parameters associated with a first lighting system at the first vehicle or a second set of parameters associated with a second lighting system at the second vehicle.

In an aspect of the disclosure, a method, a computer-readable medium, and an apparatus are provided. The apparatus transmits, to a roadside unit (RSU), a message that includes information associated with the vehicle. The apparatus receives, from the RSU based on the transmitted message, an indication to modify a set of parameters associated with a lighting system at the vehicle. The apparatus modifies the set of parameters associated with the lighting system at the vehicle based on the indication.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a diagram illustrating an example of safety message core data in accordance with various aspects of the present disclosure.

FIG. 7 is a diagram illustrating an example of safety message core data in accordance with various aspects of the present disclosure.

FIG. 8 is a diagram illustrating an example of a safety message associated with exterior lights of a vehicle in accordance with various aspects of the present disclosure.

DETAILED DESCRIPTION

Figure 1:
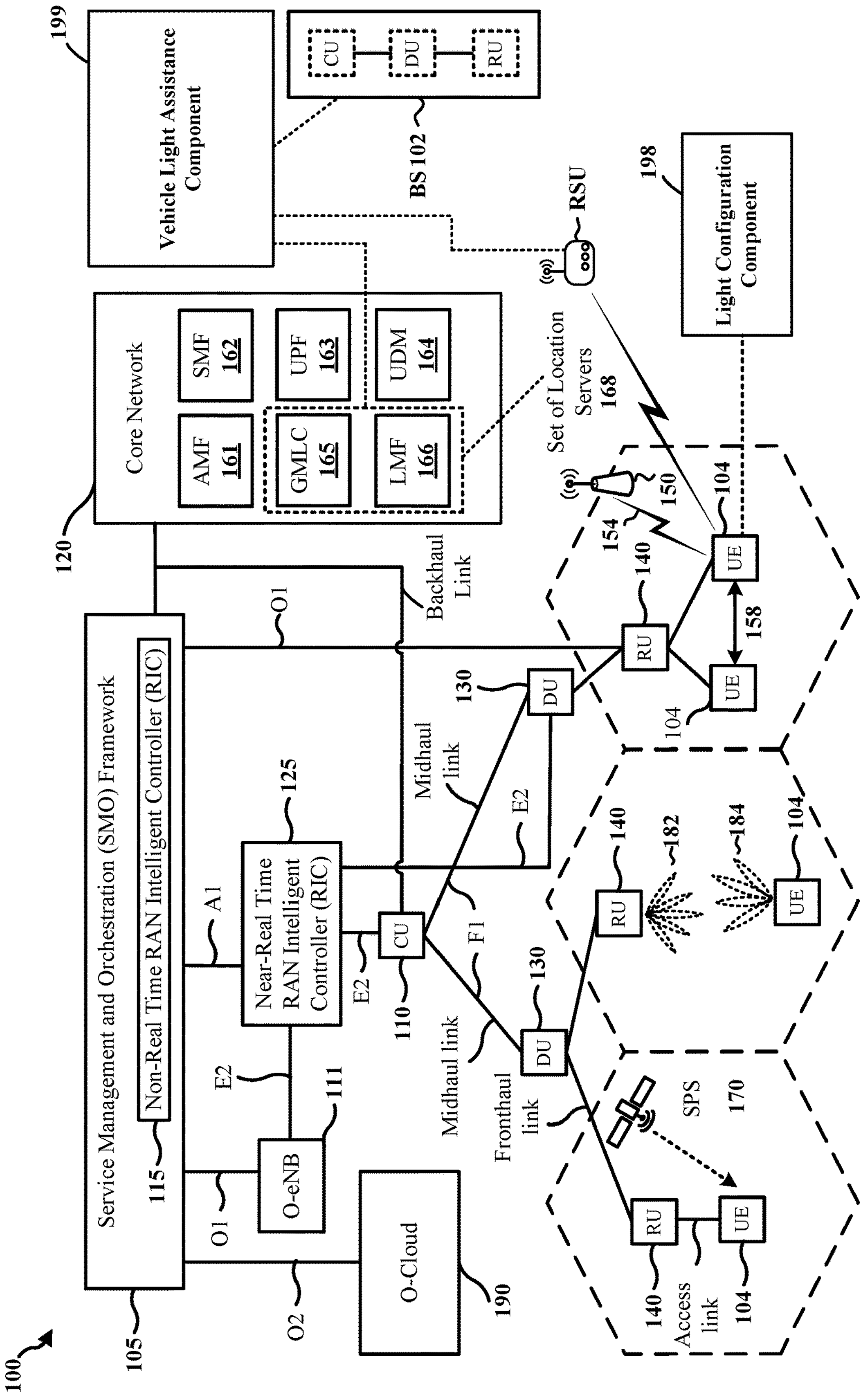
FIG. 1 is a diagram illustrating an example of a wireless communications system and an access network.

Aspects presented herein may improve road safety by enabling vehicles to perform automatic light distribution (or to be configured with an automatic light distribution system) based on vehicle-to-everything (V2X)/cellular vehicle-to-everything (C-V2X) (V2X/C-V2X). Aspects presented herein may improve the light distribution system feature in vehicles, such that the light distribution system may become more robust and fix/improve the scenarios where current automatic headlight systems (e.g., based on a vehicle's illuminance sensor(s)) are incapable of achieving. In one aspect of the present disclosure, a roadside unit (RSU) or a set of RSUs may be used to assist vehicles to control their headlights, such as switching between high beams and low beams or adjusting the brightness, intensity, and/or range of their headlights (which may be used interchangeably with "headlight beams"). Aspects presented herein may apply to both V2X/C-V2X equipped vehicles (e.g., vehicles with V2X/C-V2X capabilities) and non-V2X/C-V2X equipped vehicles (e.g., vehicles without V2X/C-V2X capabilities).

Aspects presented herein are directed to techniques for automatic vehicle headlight distribution (adaptive headlight beam adjustment) based on communication between vehicles and/or RSU and vehicles. Aspects presented herein include the following aspects. 1) Inter-vehicle communication (e.g., CV2X): vehicle can automatically adjust their headlight beams based on basic safety message (BSM) messages exchanged between the vehicles. 2) When vehicles are out of communication ranges or cannot communicate due to blockages, etc., RSU can provide assistance to help approaching vehicles adjust their headlight beams based on their locations, velocity, types and sizes of vehicles, distance thresholds, etc. RSU can unicast or groupcast messages to the respective vehicles and instruct them to adjust their beams accordingly. RSU can provide assistance with respect to (a) V2X-equipped vehicles and (b) V2X and non-V2X vehicles. 3) sidelink synchronization signal (SLSS) based self-aware OBU: trigger actions such as beam adjustments based on switching of synchronization source Global Navigation Satellite System (GNSS)/SLSS.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE- PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a light configuration component 198 that may be configured to transmit, to a roadside unit (RSU), a message that includes information associated with the vehicle; receive, from the RSU based on the transmitted message, an indication to modify a set of parameters associated with a lighting system at the vehicle; and modify the set of parameters associated with the lighting system at the vehicle based on the indication. In certain aspects, the base station 102 or the one or more location servers 168 may have a vehicle light assistance component 199 (or may be associated with at least one RSU that includes the vehicle light assistance component 199) that may be configured to receive at least one of a first message that includes first information associated with a first vehicle or a second message that includes second information associated with a second vehicle; and transmit, based on at least one of the first message or the second message, an indication to modify at least one of a first set of parameters associated with a first lighting system at the first vehicle or a second set of parameters associated with a second lighting system at the second vehicle.

Figure 2B:
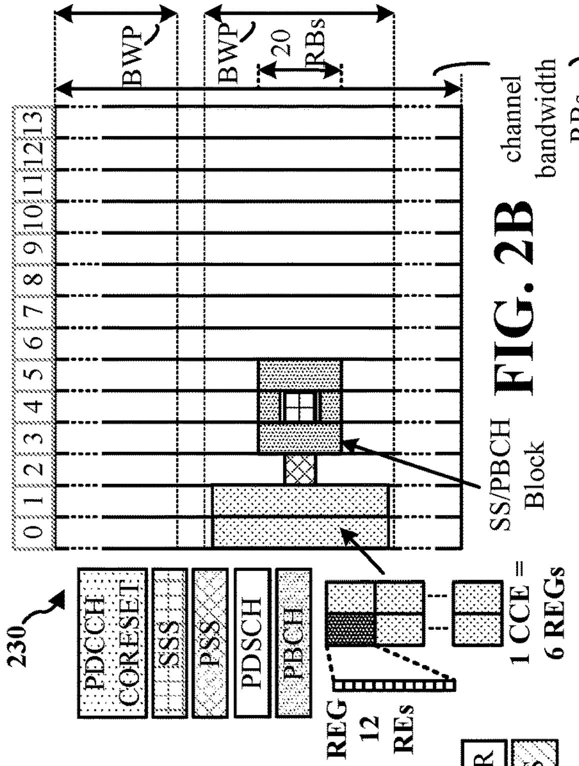
FIG. 2B is a diagram illustrating an example of downlink (DL) channels within a subframe, in accordance with various aspects of the present disclosure.
Figure 2D:
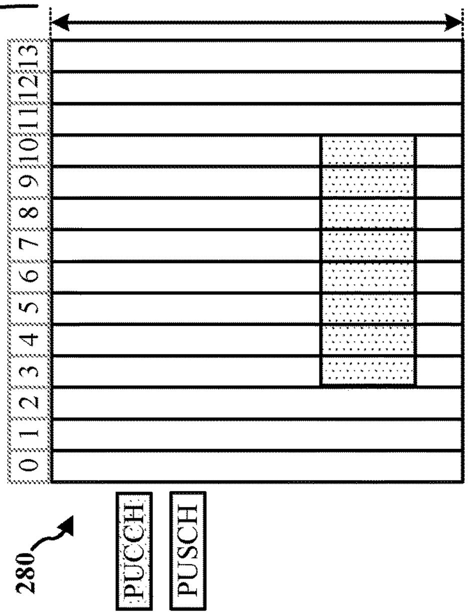
FIG. 2D is a diagram illustrating an example of uplink (UL) channels within a subframe, in accordance with various aspects of the present disclosure.
Figure 2A:
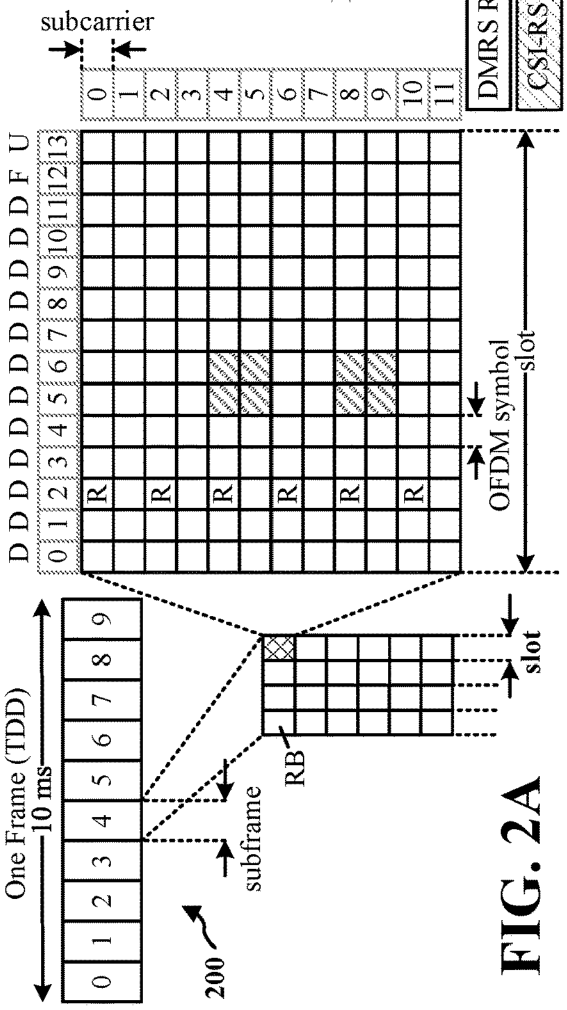
FIG. 2A is a diagram illustrating an example of a first frame, in accordance with various aspects of the present disclosure.
Figure 2C:
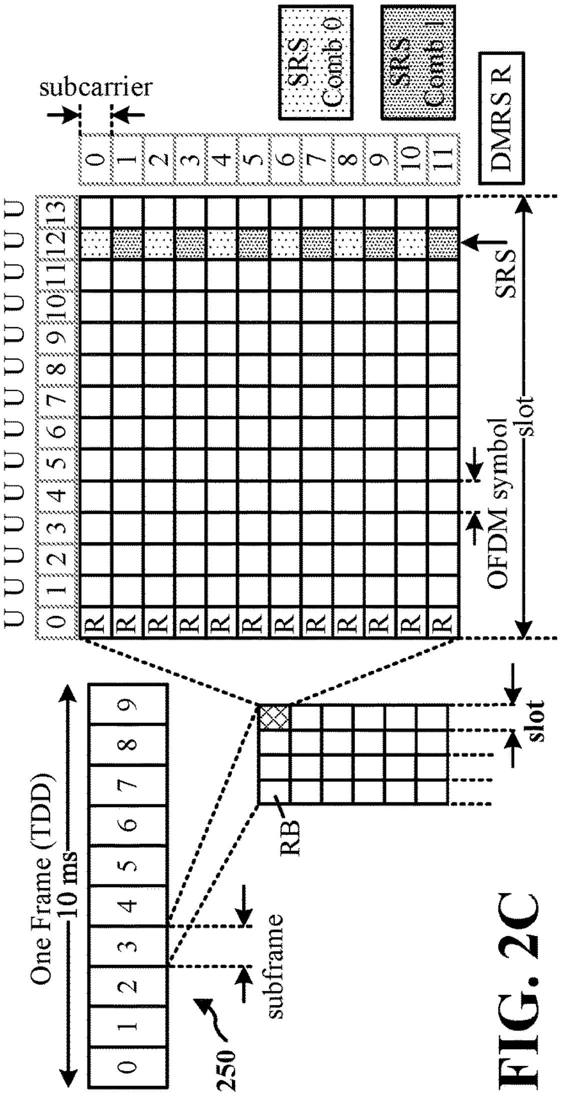
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
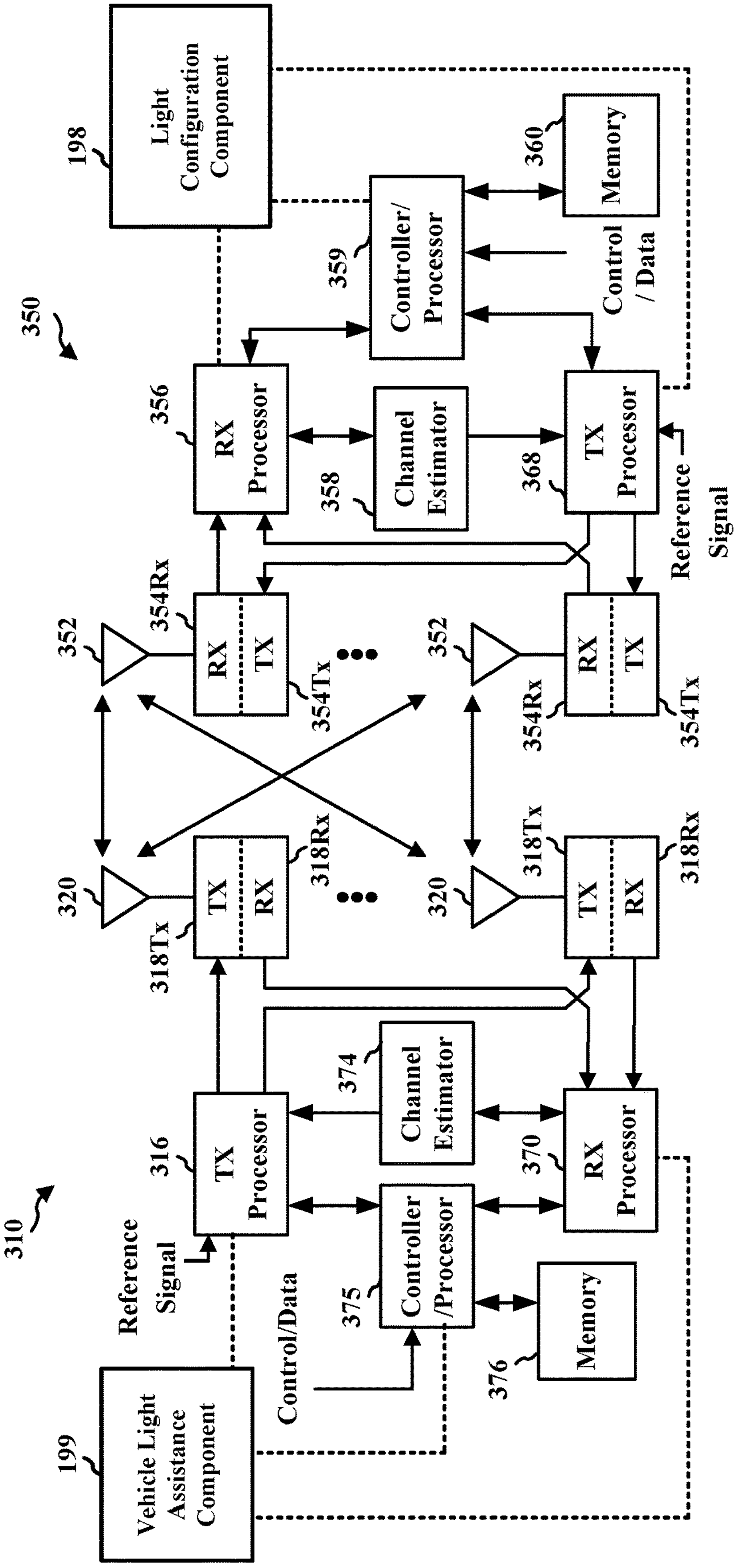
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the light configuration component 198 of FIG. 1.

At least one of the TX processor 316, the RX processor 370, and the controller/processor 375 may be configured to perform aspects in connection with the vehicle light assistance component 199 of FIG. 1.

Figure 4:
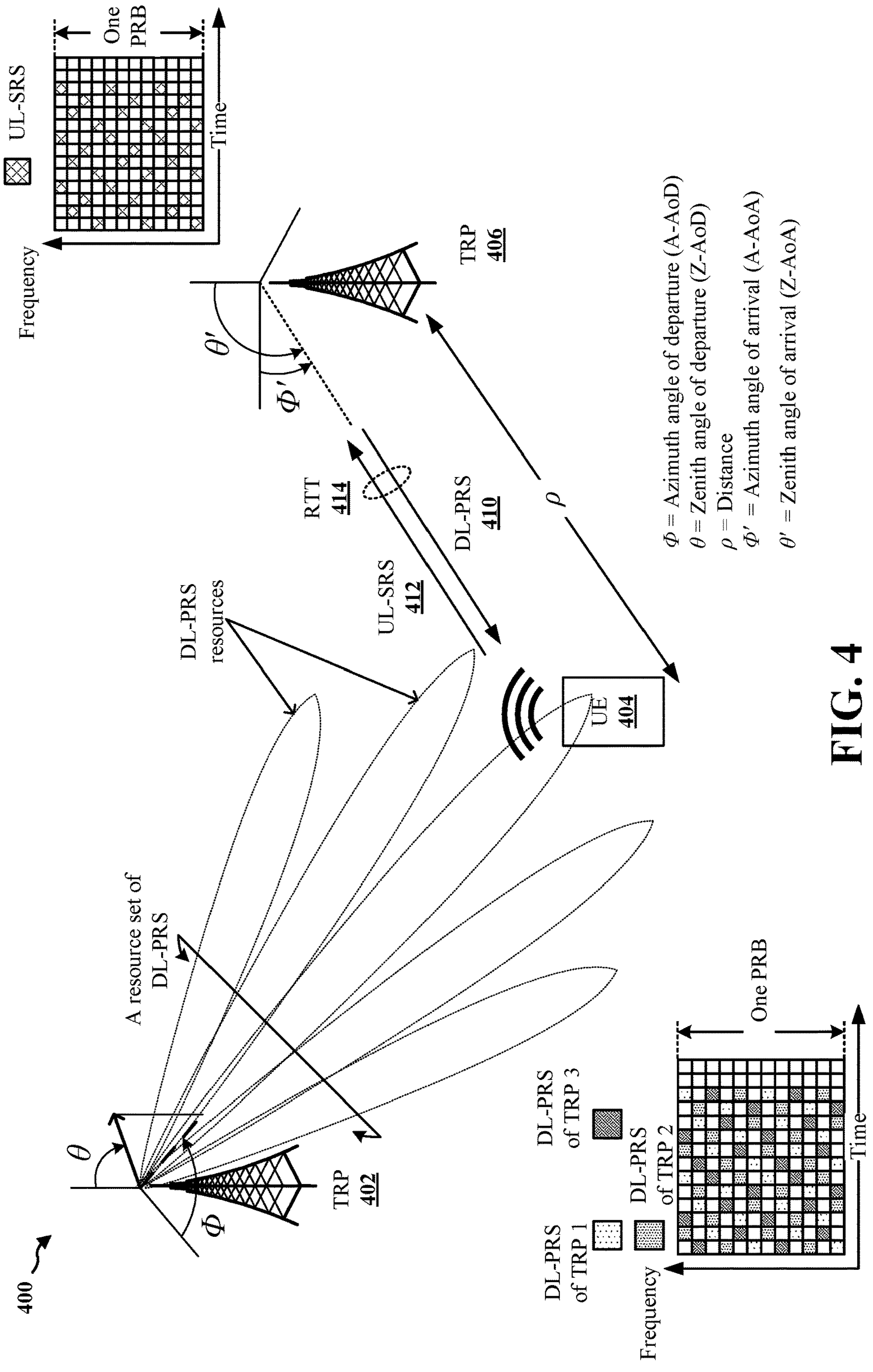
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS. SSS. SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning. PTRS) may be referred to as an "UL-PRS." In addition, for signals that may be transmitted in both the uplink and downlink (e.g., DMRS. PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

Figure 5:
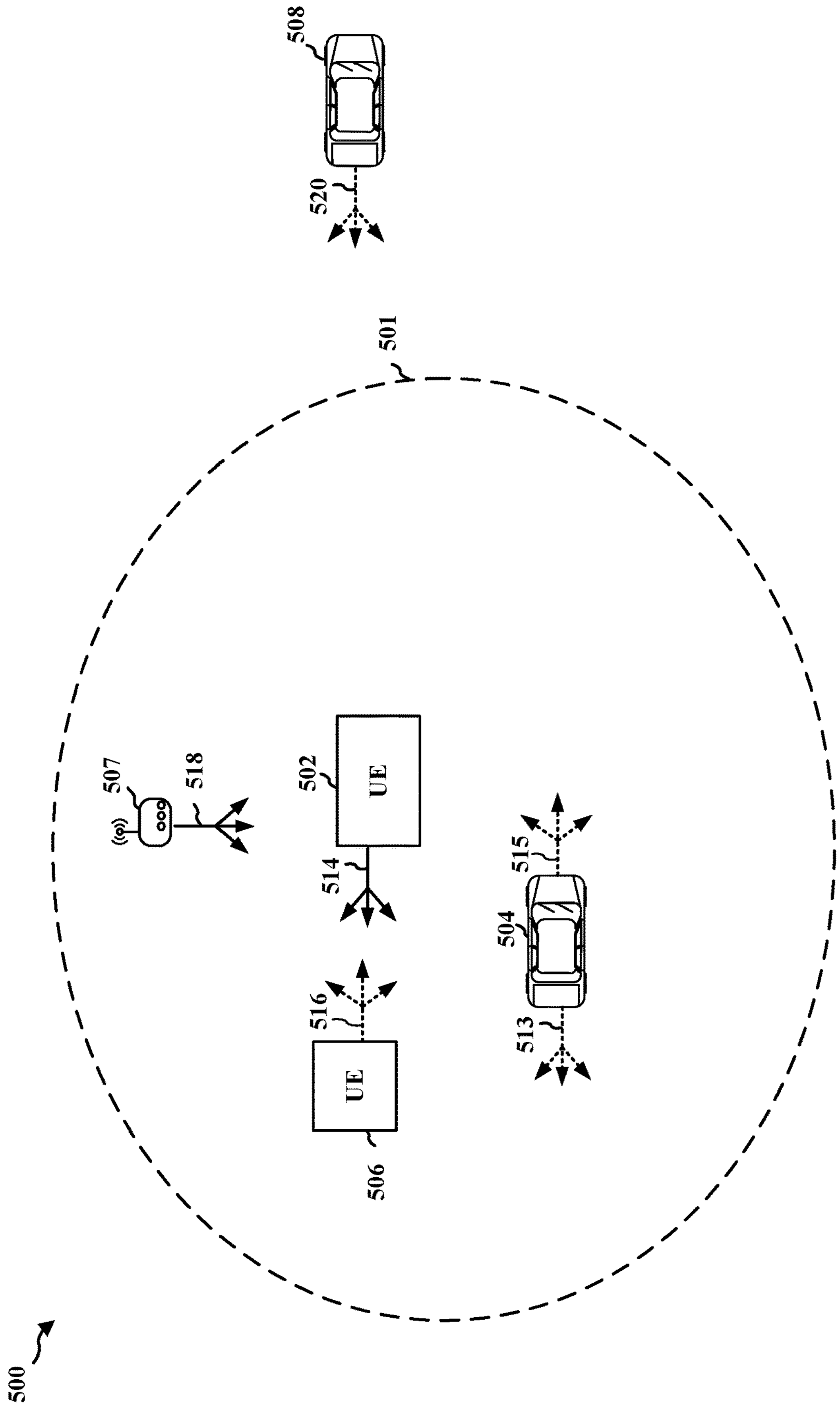
FIG. 5 is a diagram illustrating an example of sidelink communication between devices.

FIG. 5 illustrates an example 500 of sidelink communication between devices. The communication may be based on a slot structure similar to aspects described in connection with FIGS. 2A to 2D. For example, the UE 502 may transmit a sidelink transmission 514, e.g., including a control channel (e.g., PSCCH) and/or a corresponding data channel (e.g., PSSCH), that may be received by UEs 504, 506, 508. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that may be occupied by the data transmission. The SCI may be used by receiving devices to avoid interference by refraining from transmitting on the reserved resources. The UEs 502, 504, 506, 508 may each be capable of sidelink transmission in addition to sidelink reception. Thus, UEs 504, 506, 508 are illustrated as transmitting sidelink transmissions 513, 515, 516, 520. The sidelink transmissions 513, 514, 515, 516, 520 may be unicast, broadcast or multicast to nearby devices. For example, UE 504 may transmit sidelink transmissions 513, 515 intended for receipt by other UEs within a range 501 of UE 504, and UE 506 may transmit sidelink transmission 516. Additionally, or alternatively, RSU 507 may receive communication from and/or transmit communication transmission 518 to UEs 502. 504, 506, 508. One or more of the UEs 502, 504, 506, 508 or the RSU 507 may include a light configuration component 198 and/or a vehicle light assistance component 199 as described in connection with FIG. 1.

Sidelink communication may be based on one or more transmission modes. In one transmission mode for a first radio access technologies (RAT) (which may be referred to herein as "Mode 4" of a first RAT), a wireless device may autonomously select resources for transmission. A network entity may allocate one or more sub-channels for wireless devices to transmit one or more transport blocks (TB) using the one or more channels. A wireless device may randomly reserve an allocated resource for one-shot transmissions. A wireless device may use a sensing-based semi-persistent transmission scheme, or semi-persistent scheduling (SPS) mode, to select a reserved resource for transmission. For example, before selecting a resource for data transmission, a wireless device may first determine whether resources have been reserved by another wireless device. Semi-persistent transmission allows a wireless device to take advantage of semi-periodic traffic arrival by using historical interference patterns to predict future interference patterns. The wireless device may sense at least one of priority information, energy sensing information, or PSCCH decoding information to optimize resource selection. In one aspect, a wireless device may avoid selecting resources for a transmission that are scheduled to be used for a higher priority packet transmission. In another aspect, a wireless device may rank resources according to how much energy is received, and may pick the lowest energy resources. In another aspect, a wireless device may avoid resources for whom control is decoded or for which the received energy may be above a threshold.

A network entity may configure the periodicity of the reserved sub-channels using DCI transmitted over a PDCCH. The period of a semi-persistent transmission resource may be, for example, 20, 50, 100, 200, 300, 400, 500, 600, 700, 800, 900, or 1000 milliseconds (ms). Such a periodicity may be referred to as a resource reservation period (RSVP). In alternative embodiments, the periodicity may be referred to as a resource reservation interval (RRI). A network entity may limit the possible values for the periodicity of the transmission resource. A wireless device, such as a UE, may select a transmission resource based on the periodicity of an arrival packet. A counter may be used to trigger periodic reselections. For example, a wireless device may randomly select a counter between 5 and 15, and may reserve a resource based on the counter (e.g., 10*counter resource reservation periods, a number of MAC protocol data unit (PDU) transmissions equal to the counter). After every transmission, or after a reservation period passes, the counter may be decremented until it hits zero. For example, where a reservation period is 100 ms and a counter is 10, every 100 ms the counter may decrement until one second(s) passes, upon which the wireless device may then reselect a sidelink resource. In one aspect, the wireless device may reselect the sidelink resource based on a re-selection probability value. For example, in response to the counter decrementing to zero, the wireless device may reselect the sidelink resource an x % of the time, and may not reselect the sidelink resource (1−x) % of the time, where x<1. The wireless device may then reset the counter and repeat the process when the counter decrements to zero again. A wireless device may measure a received signal strength indicator (RSSI) measurement for each slot of 100 ms, and may then calculate the RSSI of the frequency band resource as an average of each of the 10 RSSI measurements taken over the period of one second. A wireless device may select a suitable frequency band resource as a resource that is in one of the bottom 20% of ranked RSSI calculated resources for a wireless device. In some aspects, the counter may be decremented after every MAC PDU transmission. A wireless device may be configured to reselect a sidelink resource after a counter expires (i.e., reaches zero), and a MAC PDU is received.

Sidelink communication for other RATs may be based on different types or modes of resource allocation mechanisms. In another resource allocation mode for a second RAT (which may be referred to herein as "Mode 1" of a second RAT), centralized resource allocation may be provided by a network entity. For example, a network entity may determine resources for sidelink communication and may allocate resources to different wireless devices to use for sidelink transmissions. In this first mode, a wireless device may receive an allocation of sidelink resources from a base station. In a second resource allocation mode (which may be referred to herein as "Mode 2"), distributed resource allocation may be provided. In Mode 2, each wireless device may autonomously determine resources to use for sidelink transmission. In order to coordinate the selection of sidelink resources by individual wireless devices, each wireless device may use a sensing technique to monitor for resource reservations by other sidelink wireless devices and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a wireless device may reserve resources for transmission in a current slot and up to two future slots (discussed below).

Thus, in the second mode (e.g., Mode 2), individual wireless devices may autonomously select resources for sidelink transmission, e.g., without a central entity such as a base station indicating the resources for the device. A first wireless device may reserve the selected resources in order to inform other wireless devices about the resources that the first wireless device intends to use for sidelink transmission(s).

In some examples, the resource selection for sidelink communication may be based on a sensing-based mechanism. For instance, before selecting a resource for a data transmission, a wireless device may previously determine whether resources have been reserved by other wireless devices.

For example, as part of a sensing mechanism for a resource allocation mode 2 of a second RAT, a wireless device may determine (e.g., sense) whether a selected sidelink resource has been reserved by other wireless device(s) before selecting a sidelink resource for a data transmission. If the wireless device determines that the sidelink resource has not been reserved by other wireless devices, the wireless device may use the selected sidelink resource for transmitting the data, e.g., in a PSSCH transmission. The wireless device may estimate or determine which radio resources (e.g., sidelink resources) may be in-use and/or reserved by others by detecting and decoding sidelink control information (SCI) transmitted by other wireless devices. The wireless device may use a sensing-based resource selection algorithm to estimate or determine which radio resources are in-use and/or reserved by others. The wireless device may receive SCI from another wireless device that may include reservation information based on a resource reservation field in the SCI. The wireless device may continuously monitor for (e.g., sense) and decode SCI from peer wireless devices. The SCI may include reservation information, e.g., indicating slots and RBs that a particular wireless device has selected for a future transmission. The wireless device may exclude resources that are used and/or reserved by other wireless devices from a set of candidate resources for sidelink transmission by the wireless device, and the wireless device may select/reserve resources for a sidelink transmission from the resources that are unused and therefore form the set of candidate resources. A wireless device may continuously perform sensing for SCI with resource reservations in order to maintain a set of candidate resources from which the wireless device may select one or more resources for a sidelink transmission. Once the wireless device selects a candidate resource, the wireless device may transmit SCI indicating its own reservation of the resource for a sidelink transmission. The number of resources (e.g., sub-channels per subframe) reserved by the wireless device may depend on the size of data to be transmitted by the wireless device. Although the example is described for a wireless device receiving reservations from another wireless device, the reservations may be received from an RSU or other device communicating based on sidelink.

In some examples, communications from a vehicle to one or more entities within a range of the vehicle (typically via sidelink (SL) or a mobile network) may be referred to as a vehicle-to-everything (V2X) or cellular vehicle-to-everything (C-V2X) communication or technology. For example, V2X/C-V2X communication or technology may include sensors, cameras, and/or wireless connectivity that enable vehicles (e.g., UEs 502, 504, 506, 508, etc.) to share real-time information with their drivers, other vehicles, cyclists, pedestrians, vulnerable road users (VRUs), mobile networks, and/or roadway infrastructure like roadside units (RSUs) and traffic lights, etc.

In addition to support safety applications, V2X/C-V2X technology, such as new radio (NR) C-V2X, may be leveraged for advanced use cases such as sensor sharing, cooperative driving, and/or platooning, etc. V2X/C-V2X may be used for considerably enhancing safety during driving experience, and may be envisioned to be ubiquitously presented in most cars in next few years. Currently, for standards/specifications related to vehicles (or which may also be referred to as automotive/automobiles), such as Society of Automotive Engineers (SAE) specifications, vehicles may not be able to control their headlights or control the headlights distribution system based on V2X/C-V2X. For example, the SAE specifications does not provide mechanisms to control the headlights distribution system using V2X/C-V2X.

In some scenarios, vehicles (or drivers of vehicles) may be specified to constantly switch between high beam(s) and low beam(s) to avoid blinding of driver(s) of oncoming vehicle(s) and vehicle(s) in front. For purposes of the present disclosure, "high beam(s)" and "low beam(s)" may refer to two different settings for the headlights/headlight beams of a vehicle, which control the intensity and/or direction of the light emitted by the headlights. For example, a high beam setting may provide a maximum light output for a vehicle and may be used when driving in situations with little to no surrounding lighting (e.g., a driver on a freeway or at a remote area at night may not be able to see the roads ahead clearly due to insufficient road light). Thus, high beam(s) are typically designed to provide a long-range, broad, and intense beam of light, illuminating a larger area ahead of the vehicle. High beam(s) may be useful for detecting potential hazards at a distance or for improving visibility on dark roads with no oncoming traffic. On the other hand, a low beam setting may provide a focused, downward-directed beam of light that illuminates the road in front of the vehicle while minimizing glare for other drivers. Low beams may have a shorter (illumination) range compared to high beams, and are typically used when driving in normal traffic conditions, including situations with oncoming vehicles. Most low beams may be configured/designed to provide sufficient lighting for driving at night without blinding other drivers. Most vehicles may have a headlight switch or lever on the driver's side that allows the driver to switch between high beam and low beam settings. It may be important for drivers to use the appropriate light setting depending on the driving conditions to ensure safety and minimize the risk of blinding other drivers on the road.

Some vehicles may be equipped with an automatic headlight system that are capable of adjusting the headlight settings of the vehicles (e.g., switching between high beams and low beams, adjusting the brightness and angle of the headlights, etc.) based on embedded illuminance sensor(s). For example, based on the amount of light sensed by the illuminance sensor(s), an automatic headlight system of a vehicle (which may be referred to as a "host vehicle" for purposes of demonstration and differentiation) may switch on the headlights of the host vehicle. During night, the automatic headlight system of the host vehicle may also be configured to switch on the high beams. However, if the automatic headlight system detects that another vehicle is in front of the host vehicle or is approaching to the host vehicle, the automatic headlight system may switch the headlights from high beams to low beams. Most automatic switching between high beams and low beams may be controlled by an on-board infrared camera (e.g., mounted at the front of the vehicle) which is capable of detecting vehicles.

In another example, as low beam headlights from a truck or a bus may still blind drivers of smaller vehicles, an automatic headlight system of a truck/bus may also be configured to adjust/use appropriate/suitable range of the headlights for the truck/bus. For example, some trucks and buses may be equipped/configured with different/multiple ranges of beam settings and/or additional light distribution system(s), such an adaptive high beam assist system/function that is designed/configured to be used by a driver for selecting between low beams and high beams, and/or for adjusting the beams within a range (e.g., the range of the beams can be adjusted).

While such automatic headlight systems may improve the road safety by preventing a host vehicle illuminating high beams at another vehicle that is approaching or is within a defined range of the host vehicle, these automatic headlight systems may not be effective in certain cases. For example, if the automatic headlight system of the host vehicle does not detect any approaching vehicle(s) and the host vehicle is using high beams, then suddenly from a turning road another vehicle appears in an oncoming direction, it may take a while for the automatic headlight system (e.g., the camera and/or the illuminance sensor(s), etc.) to detect this oncoming vehicle and switch to low beam(s) or a different light distribution setting. Such scenarios may be referred to as non-line-of-sight (NLOS) scenarios, where vehicles do not have a direct line-of-sight (LOS) with each other (e.g., not be able to see each other, there is at least one obstacle between the vehicles, etc.).

In the context of vehicle safety, a basic safety message (BSM) may refer to a communication protocol used in advanced driver assistance systems (ADAS) and vehicle-to-vehicle (V2V)/V2X/C-V2X communications. BSMs may be short data packets that vehicles exchange with each other to share information about their current status and movements. These BSMs may enable vehicles to detect and respond to potential safety risks on the road. There are also other types of vehicle/safety-related messages, such as cooperative awareness message (CAM) message(s) and/or decentralized environmental notification messages (DENM) message(s), etc., which may provide similar purposes/functions as the BSM(s). In some examples, the BSM(s), CAM message(s) and/or DENM message(s) may collectively be referred to as "intelligent transport system (ITS) message(s)" or "safety message(s)" (for purposes of the present disclosure).

FIGS. 6 and 7 are diagrams 600 and 700 illustrating an example of safety message core data (e.g., a BSM core data) in accordance with various aspects of the present disclosure. In some examples, a safety message (e.g., a BSM/CAM/DENM, etc.) may typically include information such as: (1) vehicle identification (e.g., a unique identifier for the transmitting vehicle that allows other vehicles to identify and track it); (2) position and speed (e.g., the safety message may include the current GNSS/GPS coordinates of the vehicle and its speed that helps other vehicles to calculate relative positions and predict potential collision risks); (3) heading and motion state (e.g., the safety message may indicate the direction in which the vehicle is moving and its current motion state such as accelerating, decelerating, and/or turning, etc.; and/or (4) vehicle size and type (e.g., the safety message may include details about the dimensions and characteristics of the vehicle, such as length, width, height, and vehicle type (car, truck, motorcycle, etc.).

By exchanging safety messages, vehicles may enhance situational awareness and make informed decisions to prevent collisions or optimize traffic flow. ADAS systems may also be configured to utilize safety message data to provide warnings, assist with lane changes, collision avoidance, and adaptive cruise control, among other safety features. In addition, safety messages may be configured to be part of a broader framework such as dedicated short-range communications (DSRC) or V2X/C-V2X technology, which enables communication between vehicles, infrastructure, and other entities on the road to improve overall safety and efficiency.

FIG. 8 is a diagram 800 illustrating an example of a safety message associated with exterior lights of a vehicle in accordance with various aspects of the present disclosure. In some configurations, a BSM may also include information related to exterior lights of a vehicle. For example, information elements (IEs) of a BSM associated with exterior lights of a vehicle may include: an indication of whether low beam headlights are on or off, an indication of whether high beam headlights are on or off, an indication of whether the left turn signal is on or off, an indication of whether the right turn signal is on or off, an indication of whether the hazard signal is on or off, an indication of whether the automatic light control function is on or off, an indication of whether the daytime running lights function is on or off, an indication of whether the fog light is on or off, an indication of whether the parking light is on or off, and/or an indication of whether the headlights range adjustment function is on or off (which may be configured to be an optional IE), etc.

Aspects presented herein may improve road safety by enabling vehicles to perform automatic light distribution (or to be configured with an automatic light distribution system) based on V2X/C-V2X. Aspects presented herein may improve the light distribution system feature in vehicles, such that the light distribution system may become more robust and fix/improve the scenarios where the above-mentioned automatic headlight systems (e.g., based on illuminance sensor(s)) are incapable of achieving. Aspects presented herein also provide ability to expand V2X/C-V2X beyond safety use case and for commercial use cases. In one aspect of the present disclosure, a roadside unit (RSU) may be used to assist vehicles to control their headlights, such as switching between high beams and low beams or adjusting the brightness, intensity, and/or range of their headlights. Aspects presented herein may apply to both V2X/C-V2X equipped vehicles (e.g., vehicles with V2X/C-V2X capabilities) and non-V2X/C-V2X equipped vehicles (e.g., vehicles without V2X/C-V2X capabilities).

Figure 9:
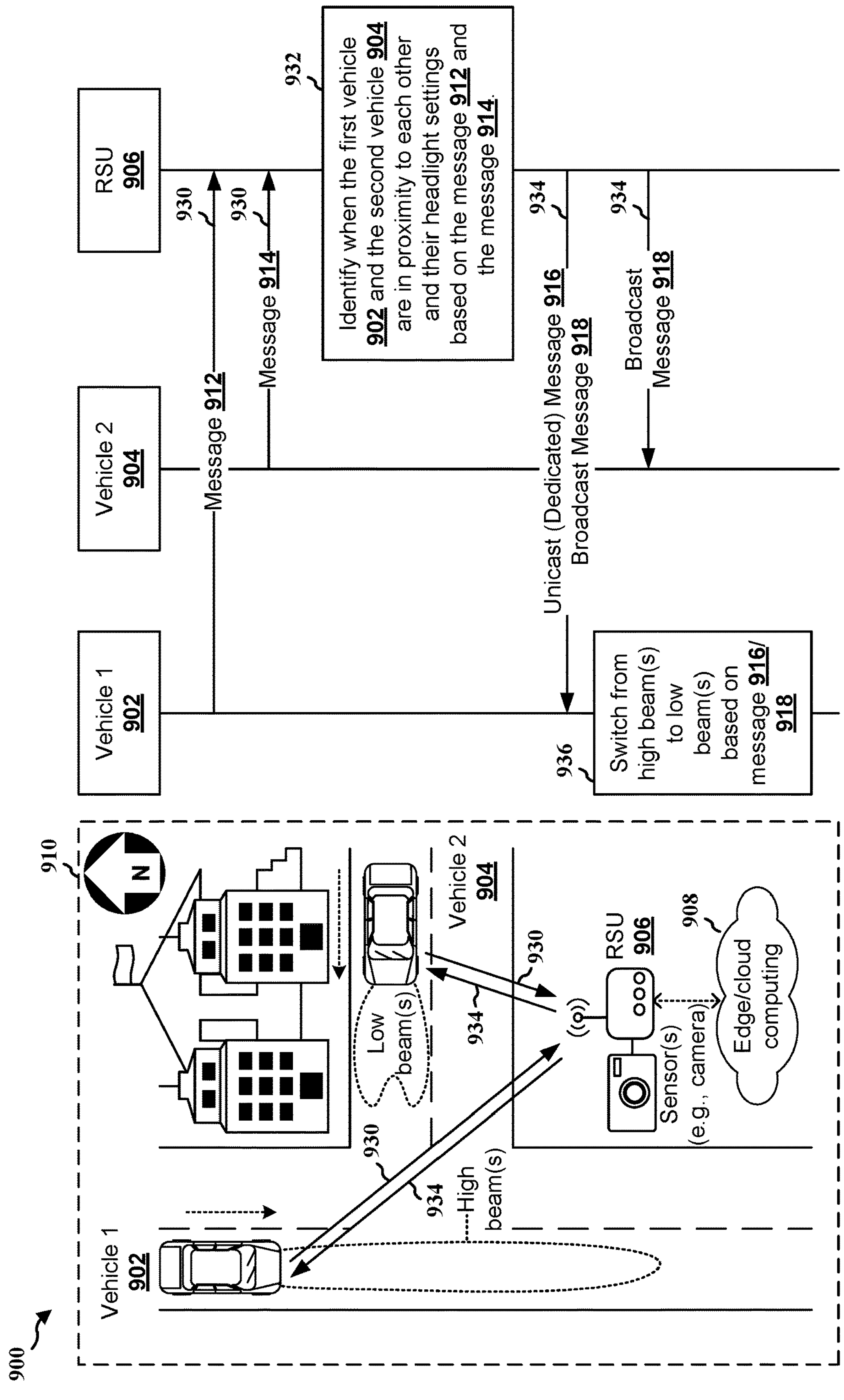
FIG. 9 is a communication flow illustrating an example of using a roadside unit (RSU) to assist vehicles with vehicle-to-everything (V2X)/cellular vehicle-to-everything (C-V2X) (V2X/C-V2X) capabilities to control their headlights in accordance with various aspects of the present disclosure.

FIG. 9 is a communication flow 900 illustrating an example of using an RSU to assist vehicles with V2X/C-V2X capabilities (e.g., between V2X/C-V2X equipped vehicles) to control their headlights in accordance with various aspects of the present disclosure. The numberings associated with the communication flow 900 do not specify a particular temporal order and are merely used as references for the communication flow 900. Note while aspects presented herein are described to be performed by one or more vehicles, they may be performed by the on-board unit(s) (OBU) of the one or more vehicles or by a UE (e.g., a mobile/wireless communication device associated with the vehicle). An OBU may refer to an electronic device or a unit that is installed on-board a vehicle. OBUs may be used in various applications, particularly in the field of transportation and toll collection systems. The specific functionalities and features of OBUs may vary depending on the intended use and the technology involved.

In one example, as shown at 910, a first vehicle 902 (Vehicle 1) with a V2X/C-V2X capability (which may be referred to as a "V2X/C-V2X equipped vehicle") may be travelling in a south direction, and a second vehicle 904 (Vehicle 2) also with a V2X/C-V2X capability may be travelling in a west direction. Both of these vehicles may not be in a direct V2V range of each other (e.g., due to obstacles such as large buildings that are between them). In other words, the first vehicle 902 and the second vehicle 904 may not be in line-of-sight (LOS) of each other (or is under a non-line-of-sight (NLOS) condition).

An RSU 906 that is equipped with at least one type of sensor(s), such as a camera, a radar (e.g., for speed detection), and/or a light detection and ranging (LIDAR), etc., may be located in the intermediate of a path (e.g., between the first vehicle 902 and the second vehicle 904). For example, as shown at 910, the RSU 906 may be located intermediately on a curved road or in a traffic square, where the RSU 906 may be in a direct (communication) range of both the first vehicle 902 and the second vehicle 904. In some examples, an RSU may also be referred to as a network entity or a network node depending on the context.

As shown at 930, the RSU 906 may receive messages (e.g., BSMs, ITS messages, CAM messages, and/or DENMs, etc.) from the first vehicle 902 and the second vehicle 904. For example, the RSU may receive a message 912 from the first vehicle 902, and a message 914 from the second vehicle 904. As described in connection with FIGS. 6 to 8, the message 912 and the message 914 may include information related to the first vehicle 902 and the second vehicle 904, such as the speed, the heading, the location, the car dimension, and/or the vehicle type, etc. of the first vehicle 902 and the second vehicle 904.

Based on messages received from vehicles, an RSU may be configured to compute which and when vehicles are going to approach each other in an opposite direction (or the same direction) and if at least one vehicle is using high beam(s). For example, as shown at 932, based on the messages received from the first vehicle 902 and the second vehicle 904, the RSU 906 may identify when the first vehicle 902 and the second vehicle 904 are in proximity to each other (e.g., are within a threshold distance of each other such as 1 km, 5 km, 10 km, etc.) and their headlight settings (e.g., whether they are using high beam(s) or low beam(s), etc.) based on the message 912 and the message 914.

When the RSU identifies/detects that at least two vehicles are going to approach each other in the opposite/same direction and/or that at least one of the vehicles is using high beam(s), the RSU may be configured to transmit a unicast/multicast message (to the first vehicle 902 and/or the second vehicle 904) to request the vehicles to use low beam(s). For purposes of the present disclosure, a unicast message may refer to a message that is sent to a single host, whereas a multicast message is sent to multiple members of a particular group.

For example, if the RSU 906 identifies that the first vehicle 902 and the second vehicle 904 are approaching each other (or is within a threshold distance), and that the first vehicle 902 is currently using high beam(s), as shown at 934, the RSU 906 may transmit a unicast message 916 to the first vehicle 902 (e.g., a message that is dedicated to just the first vehicle 902) to indicate/request the first vehicle 902 to switch from high beam(s) to low beam(s). In another example, instead of (or in addition to) transmitting the unicast message 916 to the first vehicle 902, the RSU 906 may be configured to transmit a broadcast message 918 to both the first vehicle 902 and the second vehicle 904 (or to vehicles within its transmission ranges) to indicate/request the first vehicle 902 and the second vehicle 904 (or vehicles within its transmission ranges) to use low beam(s). In response, as shown at 936, the first vehicle 902 may switch from high beam(s) to low beam(s) based on the unicast message 916 and/or the broadcast message 918.

Thus, the RSU 906 may have different implementations: (1) transmitting unicast/dedicated message(s) to vehicle(s) using high beam(s) to request the vehicle(s) to switch to low beam(s) when detecting multiple vehicles are approaching each other and there are vehicle(s) using high beam(s); (2) transmitting broadcast message to vehicles within its transmission range to request the vehicles to use low beam(s) when detecting multiple vehicles are approaching each other and at least one vehicle in the multiple vehicles is using high beam(s); and/or (3) transmitting broadcast message to vehicles within its transmission range to request the vehicle(s) to use low beam(s) when detecting multiple vehicles are approaching each other (regardless whether any vehicle is using high beam(s)).

In some implementations, a threshold may be defined/configured by the RSU to vehicle(s) at which point they should make the beam adjustment instead of changing the beam immediately as vehicles may cross each other after certain time. For example, the RSU 906 may define/configure a threshold for the first vehicle 902 and the second vehicle 904 at which point they should make the beam adjustment(s) (e.g., using low beam(s)), such as after ten minutes, at a specified point in time (e.g., at 9:34 pm), after travelling one kilometer, when is within 500 feet of a specified intersection, a place (e.g., near X park), or a set of coordinates (e.g., GNSS/GPS coordinates (X, Y)), etc. As such, the threshold communicated to a vehicle may be a timer, a location, a distance, or a combination of these parameters (e.g., headlights are switched to low beams on an expiration of a timer or the vehicle reaches a designated position). Then, the vehicle may apply the beam adjustment based on the threshold. In some examples, the RSU may further be configured to update this information periodically based on the changing conditions (e.g., based on traffics, speed of the vehicle, time of the day, etc.).

In some implementations, if a vehicle is a large vehicle like a truck, the RSU may also be configured to inform the vehicle to use appropriate intensity/range of beam(s) to avoid blinding of drivers in smaller vehicles. For example, the RSU may inform a truck to reduce the range of its headlight beam(s). In addition, aspects presented herein may be further extended to other types of lighting systems, where the RSU may request vehicles to use appropriate light distribution system. For example, the RSU may inform vehicles within its transmission range to enable/disable fog lights, day time running lights, etc.

In some examples, the RSU 906 may perform the identification/determination of whether to indicate/request one or more vehicles to change their headlight settings via edge/cloud computing to reduce implementations cost. For example, as shown at 910, messages received from the first vehicle 902 and the second vehicle 904 (e.g., the first message 912 and the second message 914) may be forwarded to a cloud computing server 908. Then, the cloud computing server 908 may identify whether the first vehicle 902 and the second vehicle 904 are in proximity to each other and/or whether any of the vehicles is using high beam(s) based on these messages. If the cloud computing server 908 identifies/determines that the first vehicle 902 and the second vehicle 904 are approaching each other or are within a threshold distance of each other, and/or at least one of the vehicles is using high beam(s), the cloud computing server 908 may notify the RSU 906 regarding its identification/determination. In response, the RSU 906 may transmit the unicast/multicast message to the first vehicle 902 and/or the second vehicle 904 as described in connection with 934.

Figure 10:
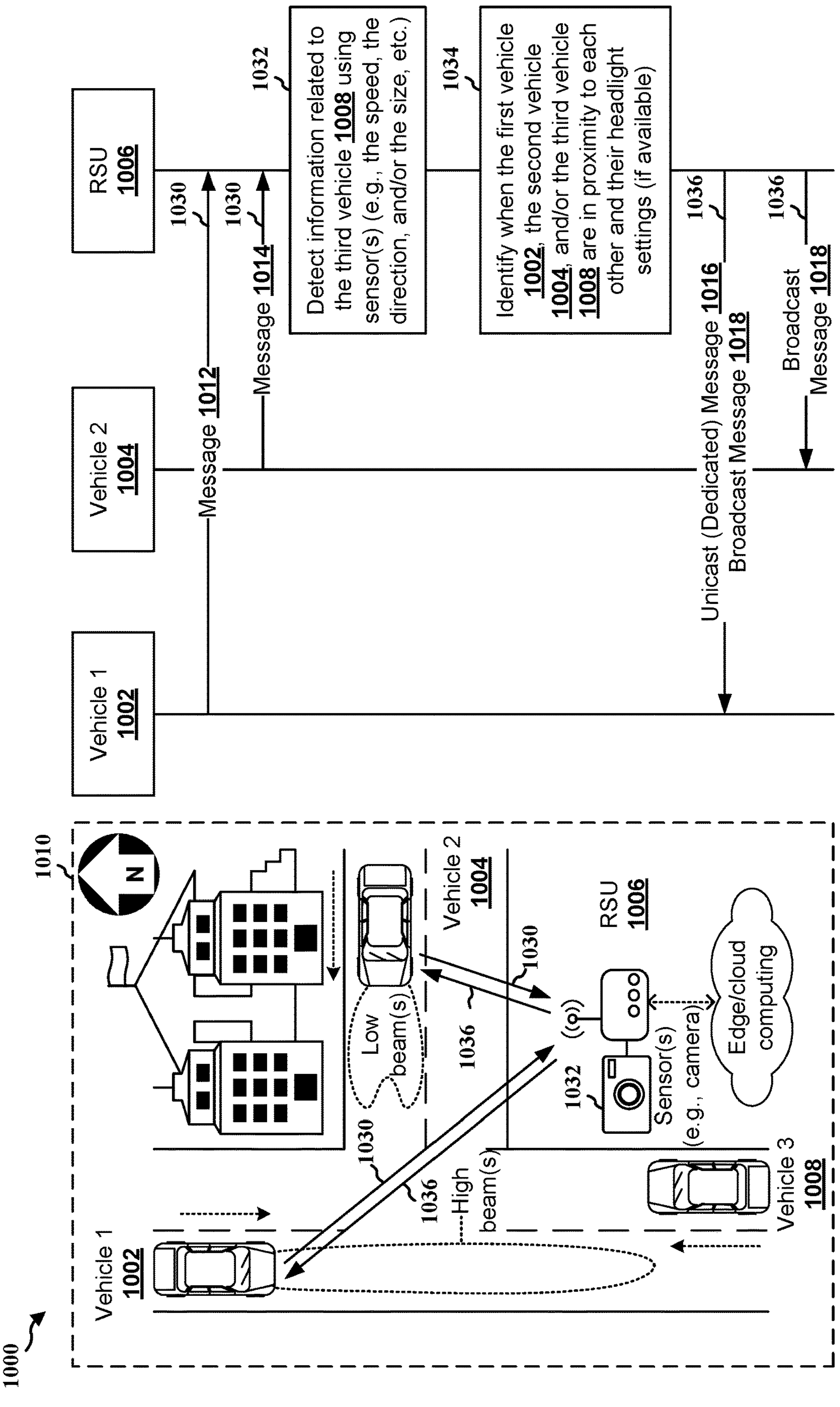
FIG. 10 is a communication flow illustrating an example of using an RSU to assist vehicles with V2X/C-V2X capabilities to control their headlights when there are vehicles without V2X/C-V2X capabilities in accordance with various aspects of the present disclosure.

FIG. 10 is a communication flow 1000 illustrating an example of using an RSU to assist vehicles with V2X/C-V2X capabilities to control their headlights when there are vehicles without V2X/C-V2X capabilities in accordance with various aspects of the present disclosure. The numberings associated with the communication flow 1000 do not specify a particular temporal order and are merely used as references for the communication flow 1000. Note while examples below are illustrated with vehicles without V2X/C-V2X capabilities, they may also include non-vehicle entities such as pedestrians, cyclist, motorcyclist, etc. As such, for purposes of the present disclosure, "vehicles without V2X/C-V2X capabilities" and/or "a non-V2X/C-V2X equipped vehicle" may include any entities that do not have the V2X/C-V2X capability.

In another example, as shown at 1010, a first vehicle 1002 (Vehicle 1) with a V2X/C-V2X capability (e.g., a V2X/C-V2X equipped vehicle) may be travelling in a south direction, and a second vehicle 1004 (Vehicle 2) also with a V2X/C-V2X capability may be travelling in a west direction. In addition, a third vehicle 1008 without a V2X/C-V2X capability (e.g., a non-V2X/C-V2X equipped vehicle, a motorcycle, a bicycle, a pedestrian, etc.) may be travelling in a north direction. All of these vehicles may not be in a direct visible range of each other (e.g., due to obstacles such as large buildings that are between them and/or due to their distances, etc.). For example, as shown at 1010, the first vehicle 1002 and the third vehicle 1008 may be on the same road travelling in an opposite direction and approaching each other. For purposes of the illustration, it may be assumed that the first vehicle 1002 and the second vehicle 1004 are approaching the third vehicle 1008 at approximately the same time or at different times.

An RSU 1006 that is equipped with at least one type of sensor(s), such as a camera, a radar (e.g., for speed detection), and/or a Lidar, etc., may be located in the intermediate of a path (e.g., between the first vehicle 1002, the second vehicle 1004, and/or the third vehicle 1008). For example, as shown at 1010, the RSU 1006 may be located intermediately on a curved road or in traffic square, where the RSU 1006 may be in a direct communication range of both the first vehicle 1002 and the second vehicle 1004. In some examples, the RSU 1006 may have information related to areas surrounding the RSU 1006, such as maps and road/lane information around the RSU 1006.

As shown at 1030, the RSU 1006 may receive messages (e.g., BSMs, ITS messages, CAM messages, and/or DENMs, etc.) from the first vehicle 1002 and the second vehicle 1004. For example, the RSU may receive a message 1012 from the first vehicle 1002, and a message 1014 from the second vehicle 1004. As described in connection with FIGS. 6 to 8, the message 1012 and the message 1014 may include information related to the first vehicle 1002 and the second vehicle 1004, such as the speed, the heading, the location, the car dimension, and/or the vehicle type of the first vehicle 1002 and the second vehicle 1004.

As shown at 1032, with the assistance/help of sensors (e.g., camera, radar, etc.) and information related to the surrounding of the RSU 1006 (e.g., maps, lane information etc.), the RSU 1006 may be able to detect information related to the third vehicle 1008, such as the speed, the direction, and/or the size of the third vehicle 1008.

Based on messages received from V2X/C-V2X equipped vehicles and the detection of non-V2X/C-V2X equipped vehicles, an RSU may be configured to compute which vehicles are going to approach each other (e.g., in an opposite/same direction) and if at least one vehicle is using high beam(s). For example, as shown at 1034, based on the messages received from the first vehicle 1002 and the second vehicle 1004 and the detection of the third vehicle 1008, the RSU 1006 may identify when the third vehicle 1008 are approaching both the first vehicle 1002 and the second vehicle 1004 (e.g., are within a threshold distance of the third vehicle 1008 such as 1 km, 5 km, 10 km, etc.), and (optionally) that at least one of the vehicles (e.g., the first vehicle 1002 and/or the second vehicle 1004) is using high beam(s) (e.g., based on the message 1012 and the message 1014). In other words, the RSU 1006 may compute intelligently that when the first vehicle 1002 and the second vehicle 1004 are going to approach the third vehicle 1008 and whether any of the vehicles is using high beam(s).

Similarly, after the RSU identifies/detects that at least two vehicles (including V2X/C-V2X equipped vehicle(s) and non-V2X/C-V2X equipped vehicle(s)) arc going to approach each other and/or that at least one of the vehicles is using high beam(s), the RSU may be configured to transmit a unicast/multicast message (to the first vehicle 1002 and/or the second vehicle 1004) to request the vehicles to use (or switch to) low beam(s) or apply a different headlight setting.

For example, if the RSU 1006 identifies that the first vehicle 1002 and the second vehicle 1004 are both approaching the third vehicle 1008 (and are also approaching each other), and that the first vehicle 1002 is currently using high beam(s), as shown at 1036, the RSU 1006 may transmit a unicast message 1016 to the first vehicle 1002 (e.g., a message that is dedicated to just the first vehicle 1002) to indicate the first vehicle 1002 to switch from high beam(s) to low beam(s). In another example, instead of (or in addition to) transmitting the unicast message 1016 to the first vehicle 1002, the RSU 1006 may be configured to transmit a broadcast message 1018 to both the first vehicle 1002 and the second vehicle 1004 (or to vehicles within its transmission ranges) to indicate the first vehicle 1002 and the second vehicle 1004 (or vehicles within its transmission ranges) to use low beam(s). In response, the first vehicle 1002 and/or the second vehicle 1004 may switch from high beam(s) to low beam(s) based on the unicast message 1016 and/or the broadcast message 1018. As such, the first vehicle 1002 and the second vehicle 1004 may use appropriate intensity/range of beam(s) when approaching the third vehicle 1008 to avoid blinding the driver of the third vehicle 1008. As described in connection with FIG. 9, the RSU 1006 may perform the identification/determination of whether to indicate/request one or more vehicles to change their headlight settings via edge/cloud computing to reduce implementations cost.

Similarly, a threshold may be defined/configured by the RSU to vehicle(s) at which point they should make the beam adjustment instead of changing the beam immediately as vehicles may cross each other after certain time. For example, the RSU 1006 may define/configure a threshold for the first vehicle 1002 and the second vehicle 1004 at which point they should make the beam adjustment (e.g., using low beam(s)), where the threshold may be a timer, a location, a distance, or a combination of these parameters. In some examples, the RSU may further be configured to update this information periodically based on the changing conditions (e.g., based on traffics, speed of the vehicle, time of the day, etc.). Then, the vehicle may apply the beam adjustment based on the threshold (e.g., switch from high beam(s) to low beam(s) after ten minutes, after two miles, etc.).

Similarly, in some implementations, if a vehicle is a large vehicle like a truck, the RSU may also be configured to inform the vehicle to use appropriate intensity/range of beam(s) to avoid blinding of drivers in smaller vehicles. In addition, aspects discussed in connection with FIG. 10 may be further extended to other types of lighting systems, where the RSU may request vehicles to use appropriate light distribution system. For example, the RSU may inform vehicles within its transmission range to enable/disable fog lights, day time running lights, etc.

Figure 11:
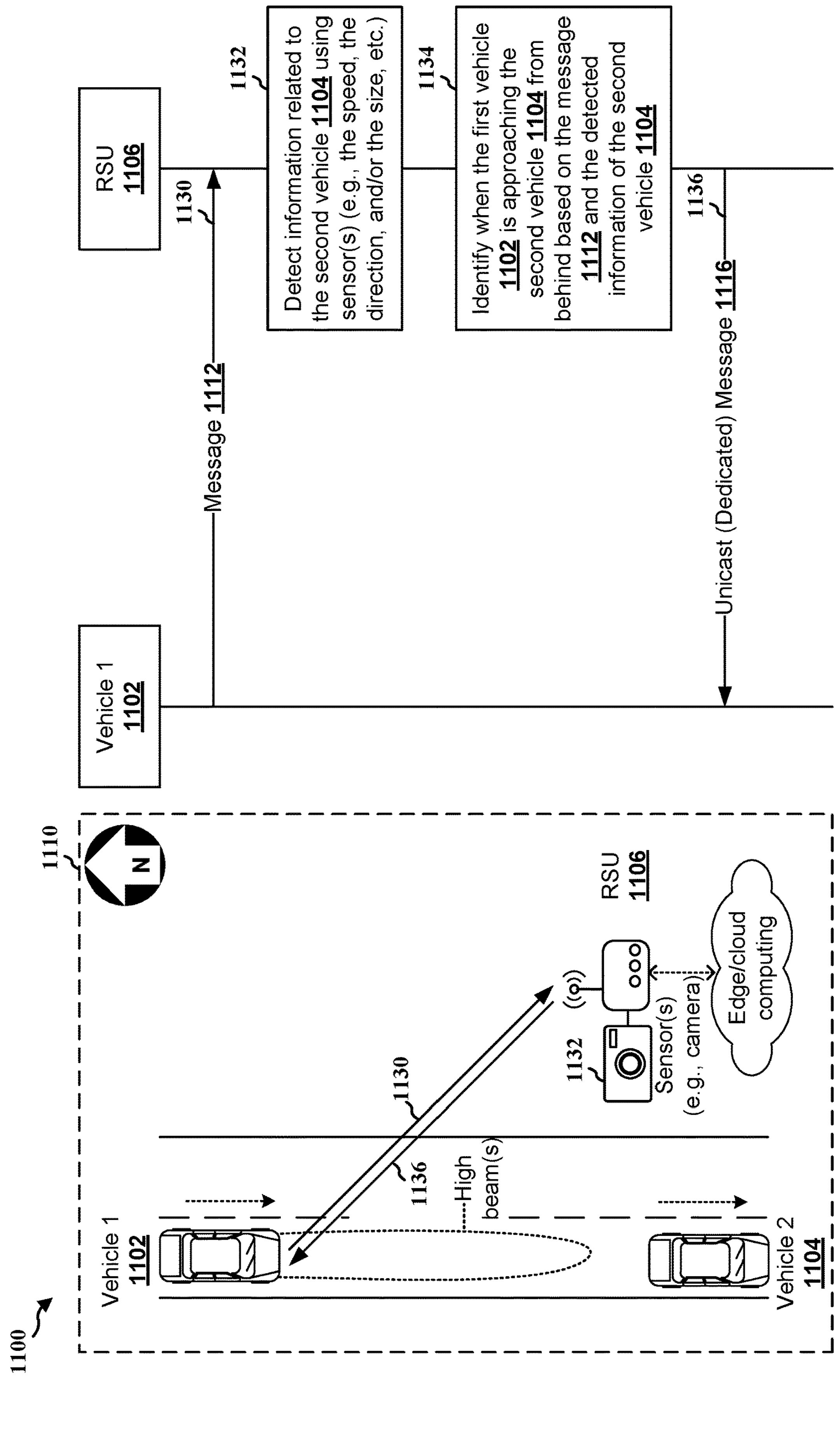
FIG. 11 is a communication flow illustrating an example of using an RSU to assist a vehicle with V2X/C-V2X capability to control its headlights when there is a vehicle without the V2X/C-V2X capability in accordance with various aspects of the present disclosure.

FIG. 11 is a communication flow 1100 illustrating an example of using an RSU to assist a vehicle with V2X/C-V2X capability to control its headlights when there is a vehicle without the V2X/C-V2X capability in accordance with various aspects of the present disclosure. The numberings associated with the communication flow 1100 do not specify a particular temporal order and are merely used as references for the communication flow 1100.

In another example, as shown at 1110, a first vehicle 1102 (Vehicle 1) with a V2X/C-V2X capability (e.g., a V2X/C-V2X equipped vehicle) may be travelling in a south direction, and a second vehicle 1104 (Vehicle 2) without a V2X/C-V2X capability may also be travelling in the south direction. In other words, the first vehicle 1102 and the second vehicle 1104 are travelling in the same direction and on the same path (e.g., on the same freeway, lane, etc.), where the second vehicle 1104 is followed by the first vehicle 1102.

An RSU 1106 that is equipped with at least one type of sensor(s), such as a camera, a radar (e.g., for speed detection), and/or a Lidar, etc., may be located in the intermediate of a path (e.g., between the first vehicle 1102 and the second vehicle 1104), where the RSU 1106 may be in a direct communication range of the first vehicle 1102. In some examples, the RSU 1106 may have information related to areas surrounding the RSU 1106, such as maps and road/lane information around the RSU 1106.

As shown at 1130, the RSU 1106 may receive a message 1112 (e.g., a BSM, an ITS message, a CAM message, and/or a DENM, etc.) from the first vehicle 1102, where the message 1112 may include information related to the first vehicle 1102, such as the speed, the heading, the location, the car dimension, and/or the vehicle type of the first vehicle 1102.

As shown at 1132, with the assistance/help of sensor(s) (e.g., camera, radar, etc.) and information related to the surrounding of the RSU 1106 (e.g., maps, lane information etc.), the RSU 1106 may be able to detect information related to the second vehicle 1104, such as the speed, the direction, and/or the size of the second vehicle 1104.

Based on message(s) received from V2X/C-V2X equipped vehicle(s) and the detection of non-V2X/C-V2X equipped vehicle(s), an RSU may be configured to compute which vehicles are going to approach each other in the same direction and (optionally) if a vehicle using high beam(s) may potentially impact another vehicle. For example, as shown at 1134, based on the message 1112 received from the first vehicle 1102 and the detection of the second vehicle 1104, the RSU 1106 may identify when the first vehicle 1102 is approaching the second vehicle 1104 from behind (e.g., is within a threshold distance of the second vehicle 1104), and (optionally) that the first vehicle 1102 is using high beam(s) (e.g., based on the message 1112). In other words, the RSU 1106 may compute intelligently that when the first vehicle 1102 is going to approach the second vehicle 1104 from behind (and that the first vehicle 1102 is using high beam(s)).

After the RSU 1106 identifies/detects that the first vehicle 1102 is approaching the second vehicle 1104 from behind, as shown at 1136, the RSU may be configured to transmit a unicast message 1116 to the first vehicle 1102 to request the first vehicle 1102 to use (or switch to low beam(s)). As described in connection with FIG. 9, the RSU 1106 may perform the identification/detection via edge/cloud computing to reduce implementations cost. In response, the first vehicle 1102 may switch from high beam(s) to low beam(s) based on the unicast message 1116.

Similarly, a threshold may be defined/configured by the RSU 1106 to the first vehicle 1102 at which point the first vehicle 1102 should make the beam adjustment instead of changing the beam immediately as vehicles may cross each other after certain time. For example, the RSU 1106 may define/configure a threshold for the first vehicle 1102 at which point the first vehicle 1102 should make the beam adjustment (e.g., using low beam(s)), where the threshold may be a timer, a location, a distance, or a combination of these parameters. In some examples, the RSU may further be configured to update this information periodically based on the changing conditions (e.g., based on traffics, speed of the vehicle, time of the day, etc.). Then, the first vehicle 1102 may apply the beam adjustment based on the threshold.

Similarly, in some implementations, if the first vehicle 1102 is a large vehicle like a truck, the RSU 1106 may also be configured to inform the first vehicle 1102 to use appropriate intensity/range of beam(s) to avoid blinding the driver of the second vehicle 1104. In addition, aspects discussed in connection with FIG. 11 may be further extended to other types of lighting systems, where the RSU may request the first vehicle 1102 to use appropriate light distribution system. For example, the RSU 1106 may inform the first vehicle 1102 to enable/disable fog lights, day time running lights, etc.

Figure 12:
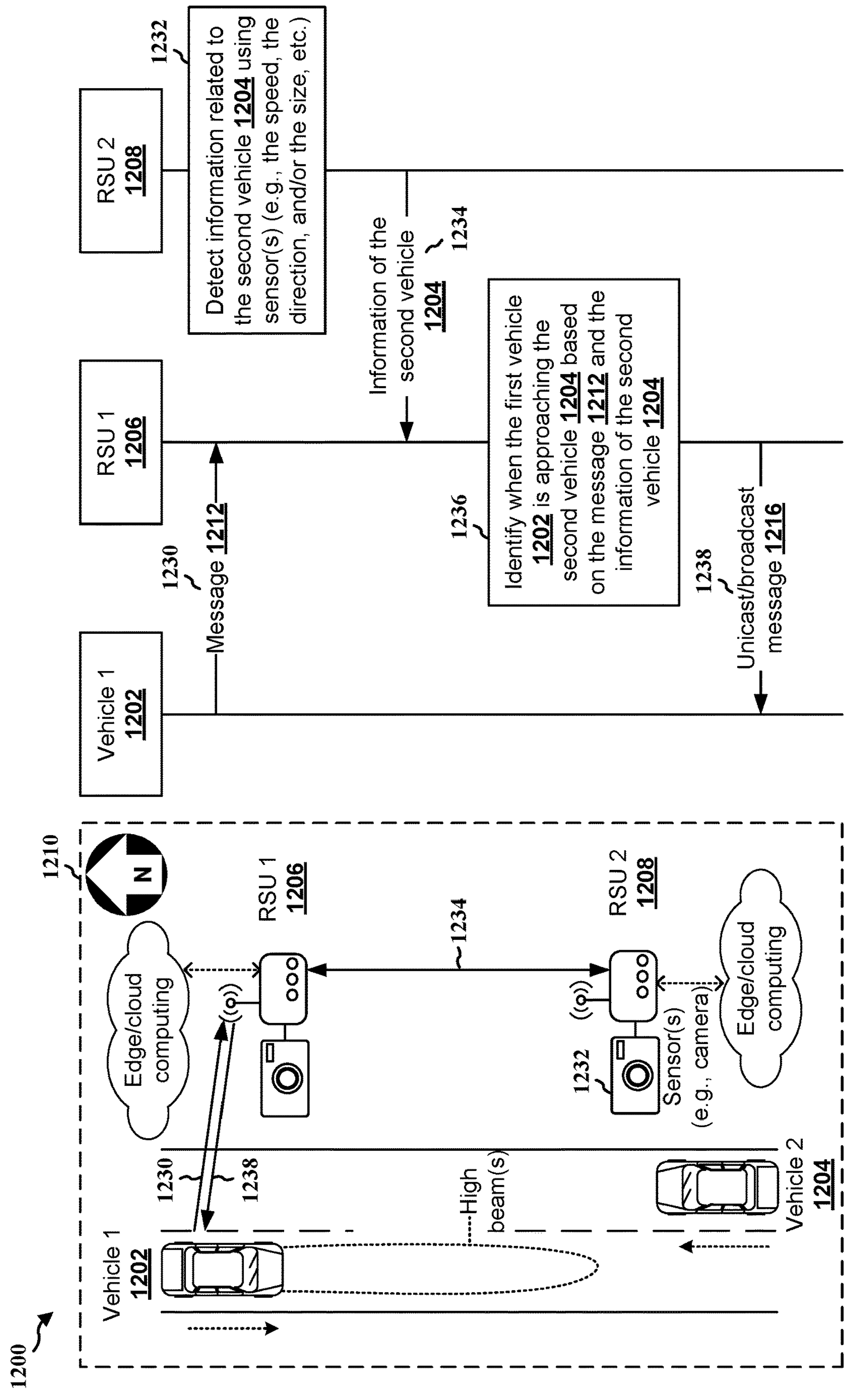
FIG. 12 is a communication flow illustrating an example of using multiple RSUs to assist a vehicle with V2X/C-V2X capability to control its headlights when there is a vehicle without the V2X/C-V2X capability in accordance with various aspects of the present disclosure.

FIG. 12 is a communication flow 1200 illustrating an example of using multiple RSUs to assist a vehicle with V2X/C-V2X capability to control its headlights when there is a vehicle without the V2X/C-V2X capability in accordance with various aspects of the present disclosure. The numberings associated with the communication flow 1200 do not specify a particular temporal order and are merely used as references for the communication flow 1200.

In another example, as shown at 1210, a first vehicle 1202 (Vehicle 1) with a V2X/C-V2X capability (e.g., a V2X/C-V2X equipped vehicle) may be travelling in a south direction, and a second vehicle 1204 (Vehicle 2) without a V2X/C-V2X capability may also be travelling in the north direction. Both the first vehicle 1202 and the second vehicle 1204 may not in a direct communication range of each other (e.g., the first vehicle 1202 and the second vehicle 1204 are unable to communicate with each other directly). In addition, the first vehicle 1202 and the second vehicle 1204 may be travelling in an opposite directions and are approaching each other.

A first RSU 1206, which may be equipped with at least one type of sensor(s), such as a camera, a radar (e.g., for speed detection), and/or a Lidar, etc., may be located in the proximity (e.g., communication range) of the first vehicle 1202, such that the first RSU 1206 may communicate directly with the first vehicle 1202 (e.g., the first vehicle 1202 and the first RSU 1206 are in a direct range of each other). In some examples, the first RSU 1206 may have information related to areas surrounding the RSU 1206, such as maps and road/lane information around the RSU 1206. In addition, a second RSU 1208 that is equipped with at least one type of sensor(s), such as a camera, a radar (e.g., for speed detection), and/or a Lidar, etc., may be located in the proximity of the second vehicle 1204 (e.g., the second vehicle 1204 and the second RSU 1208 are in a direct range of each other), such that the second RSU 1208 may be able to detect the second vehicle 1204. However, the second RSU 1208 may not be in a direct range with the first vehicle 1202 (e.g., the second RSU 1208 and the first vehicle 1202 may not be able to communicate with each other directly).

As shown at 1230, the first RSU 1206 may receive a message 1212 (e.g., a BSM, an ITS message, a CAM message, and/or a DENM, etc.) from the first vehicle 1202, where the message 1212 may include information related to the first vehicle 1202, such as the speed, the heading, the location, the car dimension, and/or the vehicle type of the first vehicle 1202.

As shown at 1232, with the help of sensors (e.g., camera, radar, etc.) and information related to the surrounding of the second RSU 1208 (e.g., maps, lane information etc.), the second RSU 1208 may be able to detect information related to the second vehicle 1204, such as the speed, the direction, and/or the size of the second vehicle 1204.

The first RSU 1206 and the second RSU 1208 may exchange information they obtained with each other. For example, as shown at 1234, after detecting the second vehicle 1204 and obtaining information related to the second vehicle 1204, the second RSU 1208 may transmit information related to the second vehicle 1204 to the first RSU 1206.

Then, as shown at 1236, based on the message 1212 received from the first vehicle 1202 and information of the second vehicle 1204 received from the second RSU 1208, the first RSU 1206 may identify when the first vehicle 1202 is approaching the second vehicle 1204 (e.g., is within a threshold distance of the second vehicle 1204), and (optionally) that the first vehicle 1202 is using high beam(s) (e.g., based on the message 1212). In other words, the first RSU 1206 may compute intelligently that when the first vehicle 1202 is going to approach the second vehicle 1204 (and that the first vehicle 1202 is using high beam(s)).

After the first RSU 1206 identifies/detects that the first vehicle 1202 is approaching the second vehicle 1204, as shown at 1238, the first RSU 1206 may be configured to transmit a unicast/multicast message 1216 to the first vehicle 1202 to request the first vehicle 1202 to use (or switch to low beam(s)). In response, the first vehicle 1202 may switch from high beam(s) to low beam(s) based on the unicast/multicast message 1216. As described in connection with FIG. 9, the first RSU 1206 may perform the identification/detection via edge/cloud computing to reduce implementations cost. Having a multiple RSU hop may be very helpful to warn the vehicles well in advance when they are travelling at higher speeds (and are further away from each other).

Similarly, a threshold may be defined/configured by the first RSU 1206 to the first vehicle 1202 at which point the first vehicle 1202 should make the beam adjustment instead of changing the beam immediately as the first vehicle 1202 may cross the second vehicle 1204 after certain time. For example, the first RSU 1206 may define/configure a threshold for the first vehicle 1202 at which point the first vehicle 1202 should make the beam adjustment (e.g., using low beam(s)), where the threshold may be a timer, a location, a distance, or a combination of these parameters. In some examples, the first RSU 1206 may further be configured to update this information periodically based on the changing conditions (e.g., based on traffics, speed of the vehicle, time of the day, etc.). Then, the first vehicle 1202 may apply the beam adjustment based on the threshold.

Similarly, in some implementations, if the first vehicle 1202 is a large vehicle like a truck, the first RSU 1206 may also be configured to inform the first vehicle 1202 to use appropriate intensity/range of beam(s) to avoid blinding the driver of the second vehicle 1204. In addition, aspects discussed in connection with FIG. 12 may be further extended to other types of lighting systems, where the first RSU 1206 may request the first vehicle 1202 to use appropriate light distribution system. For example, the first RSU 1206 may inform the first vehicle 1202 to enable/disable fog lights, day time running lights, etc.

Figure 13:
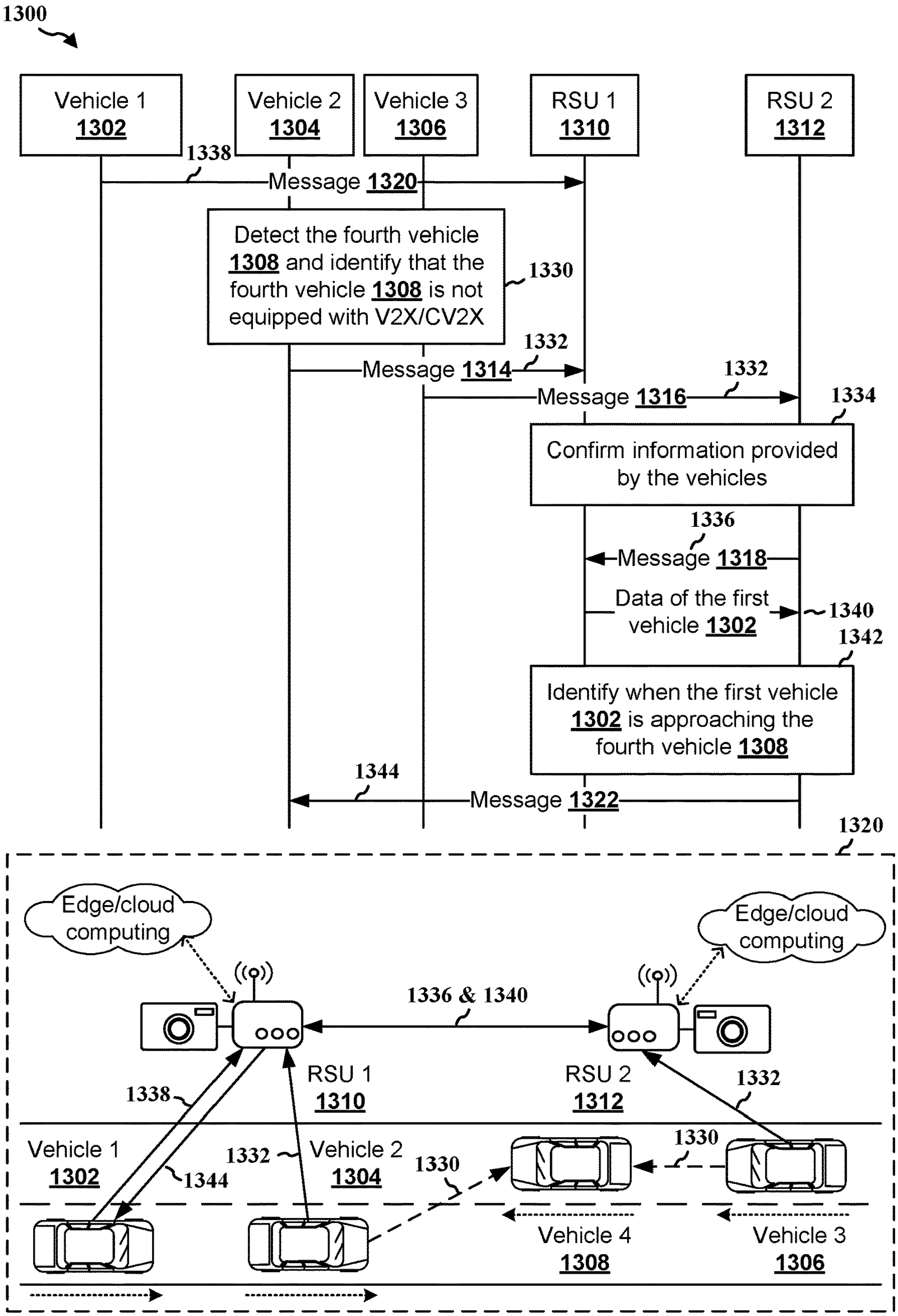
FIG. 13 is a communication flow illustrating an example of using multiple RSUs to assist a vehicle with V2X/C-V2X capability to control its headlights when there are both vehicle(s) with the V2X/C-V2X vehicle and vehicle(s) without the V2X/C-V2X capability in accordance with various aspects of the present disclosure.

FIG. 13 is a communication flow 1300 illustrating an example of using multiple RSUs to assist a vehicle with V2X/C-V2X capability to control its headlights when there are both vehicle(s) with the V2X/C-V2X vehicle and vehicle(s) without the V2X/C-V2X capability in accordance with various aspects of the present disclosure. The numberings associated with the communication flow 1300 do not specify a particular temporal order and are merely used as references for the communication flow 1300.

As shown at 1320, a first vehicle 1302 (Vehicle 1), a second vehicle 1304 (Vehicle 2), and a third vehicle 1306 (Vehicle 3) are equipped with V2X/C-V2X capabilities (e.g., V2X/C-V2X equipped vehicles), whereas a fourth vehicle 1308 does not have the V2X/C-V2X capability. For purposes of illustration, assuming all of these four vehicles are not in a direct (communication) range of each other (e.g., they are unable to communicate directly with each other based on sidelink). In addition, the first vehicle 1302 and the fourth vehicle 1308 may be travelling on the same road but in opposite directions and are approaching each other.

In one example, as shown at 1330, if the second vehicle 1304 and the third vehicle 1306 are in line-of-sight (LOS) to the fourth vehicle 1308, the second vehicle 1304 and the third vehicle 1306 may be able to detect the (presence of the) fourth vehicle 1308, such as using one or more sensor(s) (e.g., radar, Lidar, camera, etc.) that are associated with their advanced driver assistance systems (ADAS) systems.

Based on the received broadcast message(s) (e.g., the broadcast BSM(s), ITS message(s), CAM message(s), and/or DENM(s), etc.) and the position(s) of the vehicle(s) transmitting the broadcast message(s) (e.g., may be included in the broadcast message(s)), the second vehicle 1304 and the third vehicle 1306 may identify whether the fourth vehicle 1308 is equipped with V2X/C-V2X (e.g., the fourth vehicle 1308 may not have the V2X/C-V2X capability or the V2X/C-V2X capability is not activated, etc.). For example, if the second vehicle 1304 and the third vehicle 1306 detect the fourth vehicle 1308 but do not receive any messages from the fourth vehicle 1308, the second vehicle 1304 and the third vehicle 1306 may determine that the fourth vehicle 1308 does not have the V2X/C-V2X capability (i.e., the second vehicle 1304 and the third vehicle 1306 do not receive any BSM from a vehicle which they noticed from ADAS at a given position).

As shown at 1332, the second vehicle 1304 and the third vehicle 1306 may communicate the observed non-V2X/CV2X equipped vehicle information (e.g., information related to the fourth vehicle 1308 to their respective RSUs (which may be the same RSU or different RSUs). For example, the second vehicle 1304 may transmit a messages 1314 (e.g., a unicast message, a vehicle-to-infrastructure (V2I) message, etc.) to a first RSU 1310 (e.g., an RSU that is closest to the second vehicle 1304 and/or has a direct communication range with the second vehicle 1304, etc.), and the third vehicle 1306 may also transmit a messages 1316 (e.g., a unicast message, a V2I message, etc.) to a second RSU 1312 (e.g., an RSU that is closest to the third vehicle 1306 and/or has a direct communication range with the third vehicle 1306, etc.). As discussed in connection with FIGS. 6 to 8, the message 1314 and the message 1316 may be BSMs, ITS messages, CAM messages, and/or DENMs, etc. that include information related to the fourth vehicle 1308, such as the speed, the heading, the location, the car dimension, and/or the vehicle type of the fourth vehicle 1308.

In some implementations, as shown at 1334, if an RSU is equipped with at least one sensor, such as a camera, a radar (e.g., for speed detection), and/or a Lidar, etc., and/or has information related to areas surrounding the RSU, such as maps and road/lane information around the RSU, the RSU may also confirm the information shared by the vehicles. For example, the first RSU 1310 may confirm whether the information provided by the second vehicle 1304 (e.g., information related to the fourth vehicle 1308) using its sensor(s) to detect the fourth vehicle 1308 and/or obtain information related to the fourth vehicle 1308 (e.g., its speed, size, direction, etc.).

In some implementations, RSUs may also share information they obtained with each other. For example, as shown at 1336, the second RSU 1312 may unicast information obtained from the third vehicle 1306 or detected by the second RSU 1312 to the first RSU 1310 (e.g., via a message 1318) which is located in the same direction where the fourth vehicle 1308 is traveling/heading (e.g., information related to the fourth vehicle 1308), such that the first RSU 1310 may have information related to the fourth vehicle 1308 in advance (and anticipate the coming of the fourth vehicle 1308).

In some implementations, as the first RSU 1310 may have information related to the first vehicle 1302 (e.g., received from the first vehicle 1302 via a message 1320 as shown at 1338), as shown at 1340, the first RSU 1310 may also transmit information/data related to the first vehicle 1302 to the second RSU 1312. Based on the information/data related to the first vehicle 1302, as shown at 1342, the first RSU 1310 and/or the second RSU 1312 may compute intelligently when the first vehicle 1302 is going to approach the fourth vehicle 1308. Based on the computation, as shown at 1344, the first RSU 1310 may transmit a unicast messaging with the first vehicle 1302 (e.g., via a message 1322) and request the first vehicle 1302 to use low beam(s) or using beams with appropriate range. In response, the first vehicle 1302 may switch from high beam(s) to low beam(s) based on this unicast messaging. As described above, the first RSU 1310 may also perform the computation via edge/cloud computing to reduce implementations cost.

Similarly, a threshold may be defined/configured by the first RSU 1310 to the first vehicle 1302 at which point the first vehicle 1302 should make the beam adjustment instead of changing the beam immediately as the first vehicle 1302 may cross the fourth vehicle 1308 after certain time. For example, the first RSU 1310 may define/configure a threshold for the first vehicle 1302 at which point the first vehicle 1302 should make the beam adjustment (e.g., using low beam(s)), where the threshold may be a timer, a location, a distance, or a combination of these parameters. Then, the first vehicle 1302 may apply the beam adjustment based on the threshold. In some examples, the first RSU 1310 may further be configured to update this information periodically based on the changing conditions (e.g., based on traffics, speed of the vehicle, time of the day, etc.).

As illustrated, having V2X/C-V2X equipped vehicle(s) sharing information related to non-V2X/C-V2X equipped vehicle(s) may be helpful if RSUs are not equipped with specified vehicle identification sensor(s). The shared information may also be used to increase the confidence of the information detected by RSUs (e.g., for confirming the accuracy and/or reliability of information shared between different entities).

In another aspect of the present disclosure, the GNSS feature/function of a vehicle (or a UE) may be used by the vehicle (or the UE) for maintaining frame timing under V2X/C-V2X. However, in the case of non-GNSS coverage areas such as underground parking, tunnels, etc., the vehicle may be configured to use sidelink synchronization signal (SLSS) to get frame timing to continue the usage of V2X/C-V2X. Thus, a V2X/C-V2X equipped vehicle (or a V2X/C-V2X equipped on-board unit (OBU)) may be capable of being synchronized with GNSS and search simultaneously for SLSS signal(s). In addition, an OBU may have multiple time sources and may select an appropriate time source when specified. For example, while a vehicle is entering a tunnel or an underground parking lot, there is likely a loss in GNSS signal(s). Due to this loss, the vehicle (or its OBU) may change from GNSS to SLSS as synchronization source. Based on this, the vehicle (or its OBU) may be configured (intelligently) to determine whether certain light system(s), such as day time running light(s), low beam(s), etc., are to be used. Then, after the vehicle exits the tunnel or the underground parking lot and the vehicle (or its OBU) re-acquires the GNSS signals, the vehicle (or its OBU) may return/switch to the previous state of headlights.

Aspects presented herein may be used as a functional safety mechanism for vehicles where one subsystem may take the task of another system when there is a failure, which may be an important specification in automobile industry. For example, if on-board camera-based or illuminance-sensor based mechanism of a vehicle fails, then the vehicle may take the feedback from another source to continue the feature support.

Figure 14:
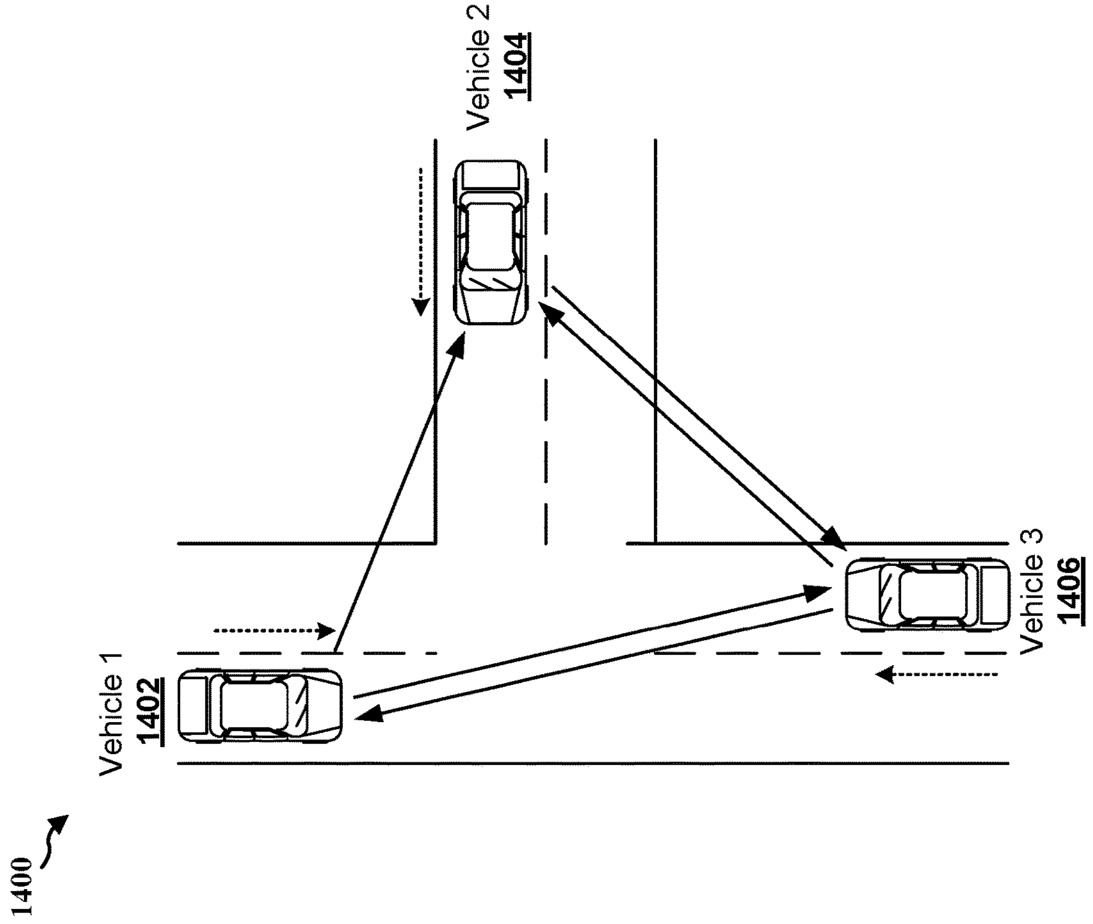
FIG. 14 is a diagram illustrating an example of vehicles with V2X/C-V2X capabilities communicating with each other to control their headlights in accordance with various aspects of the present disclosure.

FIG. 14 is a diagram 1400 illustrating an example of vehicles with V2X/C-V2X capabilities communicating with each other to control their headlights in accordance with various aspects of the present disclosure. In another aspect of the present disclosure, aspects presented herein may also apply to V2X/C-V2X equipped vehicles without using an RSU. For example, each of a first vehicle 1402, a second vehicle 1404, and a third vehicle 1406 that are equipped with V2X/C-V2X capabilities may be configured to transmit (e.g., broadcast) messages that provide their driving states, such as BSMs, ITS messages, CAM messages, and/or DENMs, etc. Then, when a vehicle receives the message(s) and determines that a vehicle is deriving in opposite direction and approaching to its own location, the vehicle may (automatically) switch to low beam(s) or apply adjustment(s) to the brightness, angle, range, and/or intensity of the headlight beams to avoid blinding the driver of the approaching vehicle. For example, based on a BSM received from the third vehicle 1406, the first vehicle 1402 may determine that the third vehicle 1406 is approaching the first vehicle 1402 in the opposite direction. Thus, if the first vehicle 1402 is currently using high beam(s), the first vehicle 1402 may be configured to switch to low beam(s) or apply a different light setting to avoid blinding the driver of the third vehicle 1406. In addition, after the third vehicle 1406 has passed the first vehicle 1402, the first vehicle 1402 may also be configured to resume/allow using the previous light setting (e.g., using the high beam(s)).

Aspects presented herein are directed to techniques for automatic vehicle headlight distribution (adaptive headlight beam adjustment) based on communication between vehicles and/or RSU and vehicles. Aspects presented herein include the following aspects. 1) Inter-vehicle communication (e.g., CV2X): vehicle can automatically adjust their headlight beams based on BSM messages exchanged between the vehicles. 2) When vehicles are out of communication ranges or cannot communicate due to blockages, etc., RSU can provide assistance to help approaching vehicles adjust their headlight beams based on their locations, velocity, types and sizes of vehicles, distance thresholds, etc. RSU can unicast or groupcast messages to the respective vehicles and instruct them to adjust their beams accordingly. RSU can provide assistance with respect to (a) V2X-equipped vehicles and (b) V2X and non-V2X vehicles. 3) SLSS based self-aware OBU: trigger actions such as beam adjustments based on switching of synchronization source GNSS/SLSS.

Figure 15:
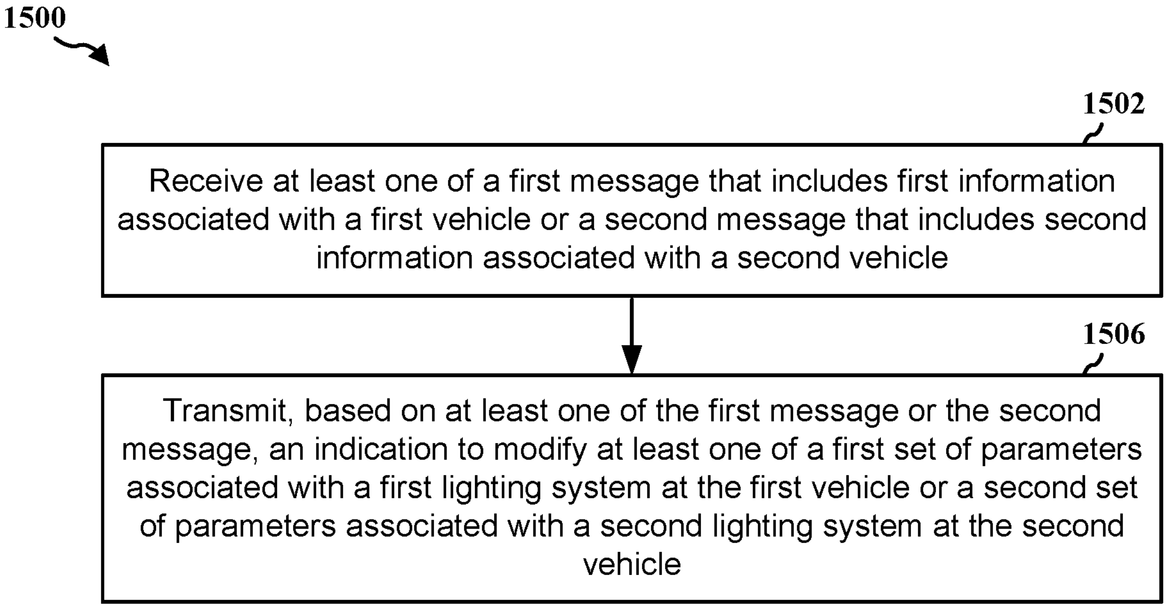
FIG. 15 is a flowchart of a method of wireless communication.

FIG. 15 is a flowchart 1500 of a method of wireless communication. The method may be performed by a road-side unit (RSU) (e.g., the RSU 507, 906, 1006, 1106; the first RSU 1206, 1310; the second RSU 1208, 1312; the network entity 1760). The method may enable the RSU to assist vehicles to control their headlights, such as switching between high beam(s) and low beam(s) or adjusting the brightness, intensity, and/or range of their headlight beam(s).

At 1502, the RSU may receive at least one of a first message that includes first information associated with a first vehicle or a second message that includes second information associated with a second vehicle, such as described in connection with FIGS. 9 to 14. For example, as shown at 930 of FIG. 9, the RSU 906 may receive messages (e.g., BSMs, ITS messages, CAM messages, and/or DENMs, etc.) from the first vehicle 902 and the second vehicle 904. For example, the RSU may receive a message 912 from the first vehicle 902, and a message 914 from the second vehicle 904. As described in connection with FIGS. 6 to 8, the message 912 and the message 914 may include information related to the first vehicle 902 and the second vehicle 904, such as the speed, the heading, the location, the car dimension, and/or the vehicle type of the first vehicle 902 and the second vehicle 904. The reception of the first message and the second message may be performed by, e.g., the vehicle light assistance component 199, the network processor(s) 1712, and/or the network interface 1780 of the network entity 1760 in FIG. 17.

At 1506, the RSU may transmit, based on at least one of the first message or the second message, an indication to modify at least one of a first set of parameters associated with a first lighting system at the first vehicle or a second set of parameters associated with a second lighting system at the second vehicle, such as described in connection with FIGS. 9 to 14. For example, as shown at 934 of FIG. 9, the RSU 906 may transmit a unicast message 916 to the first vehicle 902 (e.g., a message that is dedicated to just the first vehicle 902) to indicate the first vehicle 902 to switch from high beam(s) to low beam(s). In another example, instead of (or in addition to) transmitting the unicast message 916 to the first vehicle 902, the RSU 906 may be configured to transmit a broadcast message 918 to both the first vehicle 902 and the second vehicle 904 (or to vehicles within its transmission ranges) to indicate the first vehicle 902 and the second vehicle 904 (or vehicles within its transmission ranges) to use low beam(s). The transmission of the indication may be performed by, e.g., the vehicle light assistance component 199, the network processor(s) 1712, and/or the network interface 1780 of the network entity 1760 in FIG. 17.

In one example, the RSU may identify that the first vehicle and the second vehicle are within a threshold distance of each other based on the first information and the second information, where to transmit the indication to modify, the RSU may transmit the indication to modify further based on the identification that the first vehicle and the second vehicle are within the threshold distance of each other, such as described in connection with FIGS. 9 to 14. For example, as shown at 932 of FIG. 9, the RSU 906 may identify when the first vehicle 902 and the second vehicle 904 are in proximity to each other and their headlight settings based on the message 912 and the message 914. The identification of the first vehicle and the second vehicle are within the threshold distance of each other may be performed by, e.g., the vehicle light assistance component 199, the network processor(s) 1712, and/or the network interface 1780 of the network entity 1760 in FIG. 17. In some implementations, to identify that the first vehicle and the second vehicle are within the threshold distance of each other, the RSU may identify that the first vehicle and the second vehicle are approaching each other or identify that the first vehicle and the second vehicle are traveling in a same direction as each other.

In another example, to transmit the indication, the RSU may transmit the indication to at least one of the first vehicle, the second vehicle, or a second RSU via unicast or multicast.

In another example, the first message may be a first BSM, a first ITS message, a first CAM message, or a first DENM message, and the second message may be a second BSM, a second ITS message, a second CAM message, or a second DENM message.

In another example, the first lighting system may include one or more first headlight beams or one or more first fog light beams, and the second lighting system may include one or more second headlight beams or one or more second fog light beams. In some implementations, the indication to modify may include an instruction to adjust an intensity or a light range of at least one of: the one or more first headlight beams, the one or more first fog light beams, the one or more second headlight beams, or the one or more second fog light beams.

In another example, the first information may include at least one of: a first speed, a first heading direction, a first location, first beam information, or first dimension information of the first vehicle, and the second information may include at least one of: a second speed, a second heading direction, a second location, second beam information, or second dimension information of the second vehicle.

In another example, where to receive the first message, the RSU may receive the first message from the first vehicle or a second RSU, and to receive the second message, the RSU may receive the second message from the second vehicle or the second RSU.

In another example, the indication may further include a time, a distance, or a location for at least one of the first vehicle or the second vehicle to modify at least one of the first set of parameters or the second set of parameters.

In another example, the RSU may obtaining third information associated with a third vehicle or a pedestrian, where transmitting the indication to modify includes transmitting the indication to modify further based on the third information, and where the third information includes at least one of: a third speed, a third heading direction, a third location, third beam information, or third dimension information of the third vehicle or the pedestrian. In some implementations, to obtain the third information associated with the third vehicle or the pedestrian, the RSU may obtain the third information associated with the third vehicle using at least one of a camera, a sensor, a radar of the RSU, or a radar from a second RSU.

In another example, the RSU may receive, from at least one of the first vehicle or the second vehicle, third information associated with a third vehicle, where to transmit the indication to modify, the RSU may transmit the indication to modify further based on the third information associated with the third vehicle.

Figure 16:
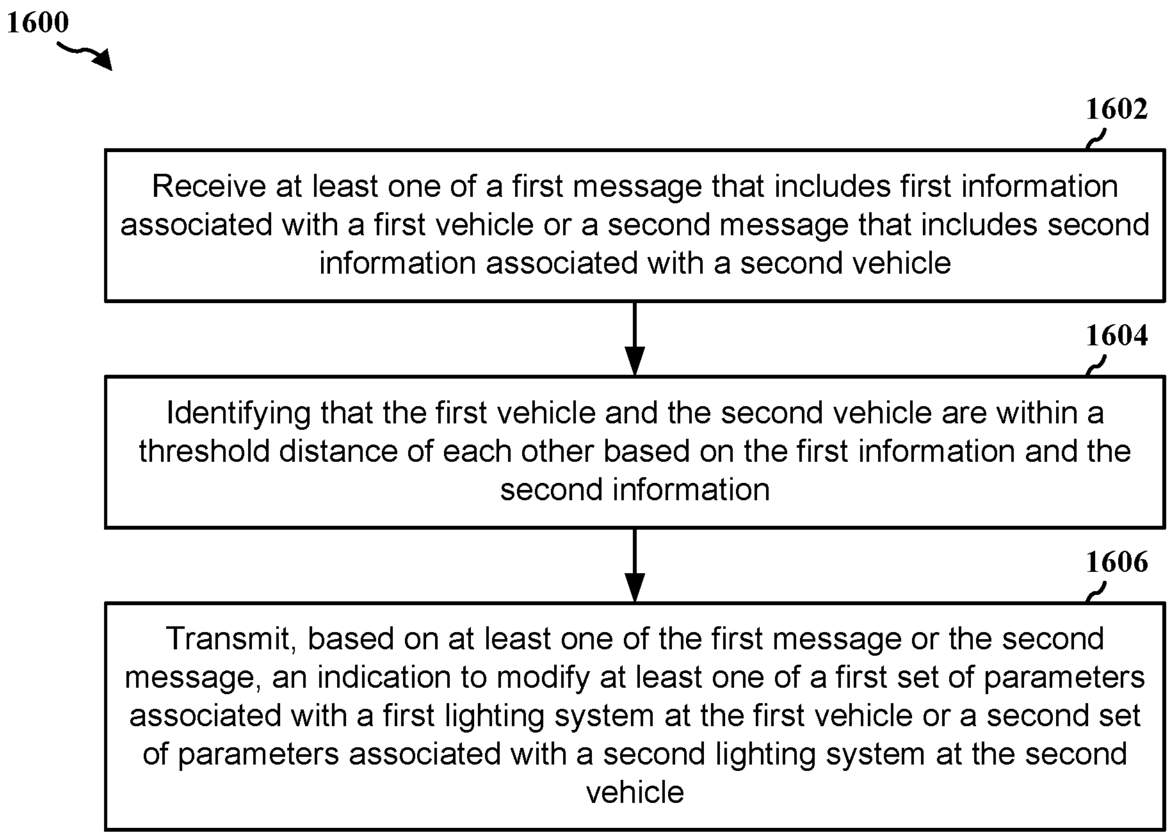
FIG. 16 is a flowchart of a method of wireless communication.

FIG. 16 is a flowchart 1600 of a method of wireless communication. The method may be performed by a road-side unit (RSU) (e.g., the RSU 507, 906, 1006, 1106; the first RSU 1206, 1310; the second RSU 1208, 1312; the network entity 1760). The method may enable the RSU to assist vehicles to control their headlights, such as switching between high beam(s) and low beam(s) or adjusting the brightness, intensity, and/or range of their headlight beam(s).

At 1602, the RSU may receive at least one of a first message that includes first information associated with a first vehicle or a second message that includes second information associated with a second vehicle, such as described in connection with FIGS. 9 to 14. For example, as shown at 930 of FIG. 9, the RSU 906 may receive messages (e.g., BSMs, ITS messages, CAM messages, and/or DENMs, etc.) from the first vehicle 902 and the second vehicle 904. For example, the RSU may receive a message 912 from the first vehicle 902, and a message 914 from the second vehicle 904. As described in connection with FIGS. 6 to 8, the message 912 and the message 914 may include information related to the first vehicle 902 and the second vehicle 904, such as the speed, the heading, the location, the car dimension, and/or the vehicle type of the first vehicle 902 and the second vehicle 904. The reception of the first message and the second message may be performed by, e.g., the vehicle light assistance component 199, the network processor(s) 1712, and/or the network interface 1780 of the network entity 1760 in FIG. 17.

At 1606, the RSU may transmit, based on at least one of the first message or the second message, an indication to modify at least one of a first set of parameters associated with a first lighting system at the first vehicle or a second set of parameters associated with a second lighting system at the second vehicle, such as described in connection with FIGS. 9 to 14. For example, as shown at 934 of FIG. 9, the RSU 906 may transmit a unicast message 916 to the first vehicle 902 (e.g., a message that is dedicated to just the first vehicle 902) to indicate the first vehicle 902 to switch from high beam(s) to low beam(s). In another example, instead of (or in addition to) transmitting the unicast message 916 to the first vehicle 902, the RSU 906 may be configured to transmit a broadcast message 918 to both the first vehicle 902 and the second vehicle 904 (or to vehicles within its transmission ranges) to indicate the first vehicle 902 and the second vehicle 904 (or vehicles within its transmission ranges) to use low beam(s). The transmission of the indication may be performed by, e.g., the vehicle light assistance component 199, the network processor(s) 1712, and/or the network interface 1780 of the network entity 1760 in FIG. 17.

In one example, as shown at 1604, the RSU may identify that the first vehicle and the second vehicle are within a threshold distance of each other based on the first information and the second information, where to transmit the indication to modify, the RSU may transmit the indication to modify further based on the identification that the first vehicle and the second vehicle are within the threshold distance of each other, such as described in connection with FIGS. 9 to 14. For example, as shown at 932 of FIG. 9, the RSU 906 may identify when the first vehicle 902 and the second vehicle 904 are in proximity to each other and their headlight settings based on the message 912 and the message 914. The identification of the first vehicle and the second vehicle are within the threshold distance of each other may be performed by, e.g., the vehicle light assistance component 199, the network processor(s) 1712, and/or the network interface 1780 of the network entity 1760 in FIG. 17. In some implementations, to identify that the first vehicle and the second vehicle are within the threshold distance of each other, the RSU may identify that the first vehicle and the second vehicle are approaching each other or identify that the first vehicle and the second vehicle are traveling in a same direction as each other.

In another example, to transmit the indication, the RSU may transmit the indication to at least one of the first vehicle, the second vehicle, or a second RSU via unicast or multicast.

In another example, the first message may be a first BSM, a first ITS message, a first CAM message, or a first DENM message, and the second message may be a second BSM, a second ITS message, a second CAM message, or a second DENM message.

In another example, the first lighting system may include one or more first headlight beams or one or more first fog light beams, and the second lighting system may include one or more second headlight beams or one or more second fog light beams. In some implementations, the indication to modify may include an instruction to adjust an intensity or a light range of at least one of: the one or more first headlight beams, the one or more first fog light beams, the one or more second headlight beams, or the one or more second fog light beams.

In another example, the first information may include at least one of: a first speed, a first heading direction, a first location, first beam information, or first dimension information of the first vehicle, and the second information may include at least one of: a second speed, a second heading direction, a second location, second beam information, or second dimension information of the second vehicle.

In another example, where to receive the first message, the RSU may receive the first message from the first vehicle or a second RSU, and to receive the second message, the RSU may receive the second message from the second vehicle or the second RSU.

In another example, the indication may further include a time, a distance, or a location for at least one of the first vehicle or the second vehicle to modify at least one of the first set of parameters or the second set of parameters.

In another example, the RSU may obtaining third information associated with a third vehicle or a pedestrian, where transmitting the indication to modify includes transmitting the indication to modify further based on the third information, and where the third information includes at least one of: a third speed, a third heading direction, a third location, third beam information, or third dimension information of the third vehicle or the pedestrian. In some implementations, to obtain the third information associated with the third vehicle or the pedestrian, the RSU may obtain the third information associated with the third vehicle using at least one of a camera, a sensor, a radar of the RSU, or a radar from a second RSU.

In another example, the RSU may receive, from at least one of the first vehicle or the second vehicle, third information associated with a third vehicle, where to transmit the indication to modify, the RSU may transmit the indication to modify further based on the third information associated with the third vehicle.

Figure 17:
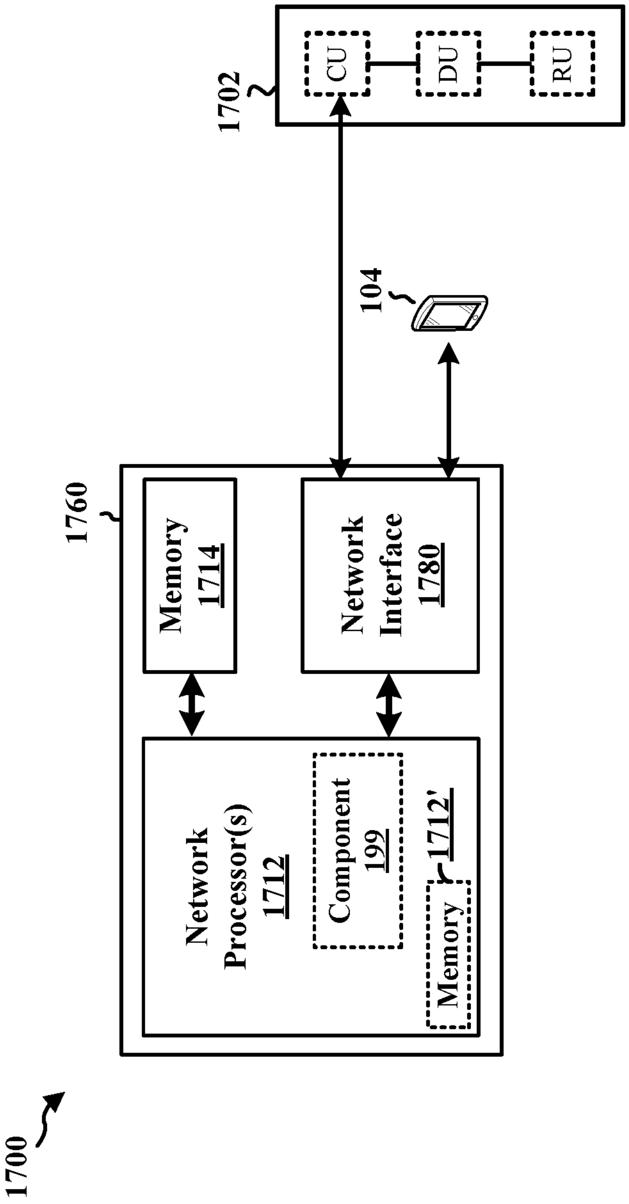
FIG. 17 is a diagram illustrating an example of a hardware implementation for an example network entity.

FIG. 17 is a diagram 1700 illustrating an example of a hardware implementation for a network entity 1760 (e.g., an RSU). In one example, the network entity 1760 may be within the core network 170. The network entity 1760 may include at least one network processor 1712. The network processor(s) 1712 may include on-chip memory 1712'. In some aspects, the network entity 1760 may further include additional memory modules 1714. The network entity 1760 communicates via the network interface 1780 directly (e.g., backhaul link) or indirectly (e.g., through a RIC) with the CU 1702. The on-chip memory 1712' and the additional memory modules 1714 may each be considered a computer-readable medium/memory. Each computer-readable medium/memory may be non-transitory. The network processor(s) 1712 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the vehicle light assistance component 199 may be configured to receive at least one of a first message that includes first information associated with a first vehicle or a second message that includes second information associated with a second vehicle. The vehicle light assistance component 199 may also be configured to transmit, based on at least one of the first message or the second message, an indication to modify at least one of a first set of parameters associated with a first lighting system at the first vehicle or a second set of parameters associated with a second lighting system at the second vehicle. The vehicle light assistance component 199 may be within the network processor(s) 1712. The vehicle light assistance component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1760 may include a variety of components configured for various functions. In one configuration, the network entity 1760 may include means for receiving at least one of a first message that includes first information associated with a first vehicle or a second message that includes second information associated with a second vehicle. The network entity 1760 may further include means for transmitting, based on at least one of the first message or the second message, an indication to modify at least one of a first set of parameters associated with a first lighting system at the first vehicle or a second set of parameters associated with a second lighting system at the second vehicle.

In one configuration, the network entity 1760 may include means for identifying that the first vehicle and the second vehicle are within a threshold distance of each other based on the first information and the second information, where the means for transmitting the indication to modify may include configuring the network entity 1760 to transmit the indication to modify further based on the identification that the first vehicle and the second vehicle are within the threshold distance of each other. In some implementations, the means for identifying that the first vehicle and the second vehicle are within the threshold distance of each other may include configuring the network entity 1760 to identify that the first vehicle and the second vehicle are approaching each other or identify that the first vehicle and the second vehicle are traveling in a same direction as each other.

In another configuration, the means for transmitting the indication may include configuring the network entity 1760 to transmit the indication to at least one of the first vehicle, the second vehicle, or a second RSU via unicast or multicast.

In another configuration, the first message may be a first BSM, a first ITS message, a first CAM message, or a first DENM message, and the second message may be a second BSM, a second ITS message, a second CAM message, or a second DENM message.

In another configuration, the first lighting system may include one or more first headlight beams or one or more first fog light beams, and the second lighting system may include one or more second headlight beams or one or more second fog light beams. In some implementations, the indication to modify may include an instruction to adjust an intensity or a light range of at least one of: the one or more first headlight beams, the one or more first fog light beams, the one or more second headlight beams, or the one or more second fog light beams.

In another configuration, the first information may include at least one of: a first speed, a first heading direction, a first location, first beam information, or first dimension information of the first vehicle, and the second information may include at least one of: a second speed, a second heading direction, a second location, second beam information, or second dimension information of the second vehicle.

In another configuration, where the means for receiving the first message may include configuring the network entity 1760 to receive the first message from the first vehicle or a second RSU, and the means for receiving the second message may include configuring the network entity 1760 to receive the second message from the second vehicle or the second RSU.

In another configuration, the indication may further include a time, a distance, or a location for at least one of the first vehicle or the second vehicle to modify at least one of the first set of parameters or the second set of parameters.

In another configuration, the network entity 1760 may include means for obtaining third information associated with a third vehicle or a pedestrian, where to transmit the indication to modify may include configuring the network entity 1760 to modify further based on the third information, and where the third information includes at least one of: a third speed, a third heading direction, a third location, third beam information, or third dimension information of the third vehicle or the pedestrian. In some implementations, to means for obtaining the third information associated with the third vehicle or the pedestrian may include configuring the network entity 1760 to obtain the third information associated with the third vehicle using at least one of a camera, a sensor, a radar of the RSU, or a radar from a second RSU.

In another configuration, the network entity 1760 may include means for receiving, from at least one of the first vehicle or the second vehicle, third information associated with a third vehicle, where the means for transmitting the indication to modify may include configuring the network entity 1760 to transmit the indication to modify further based on the third information associated with the third vehicle.

The means may be the vehicle light assistance component 199 of the network entity 1760 configured to perform the functions recited by the means.

Figure 18:
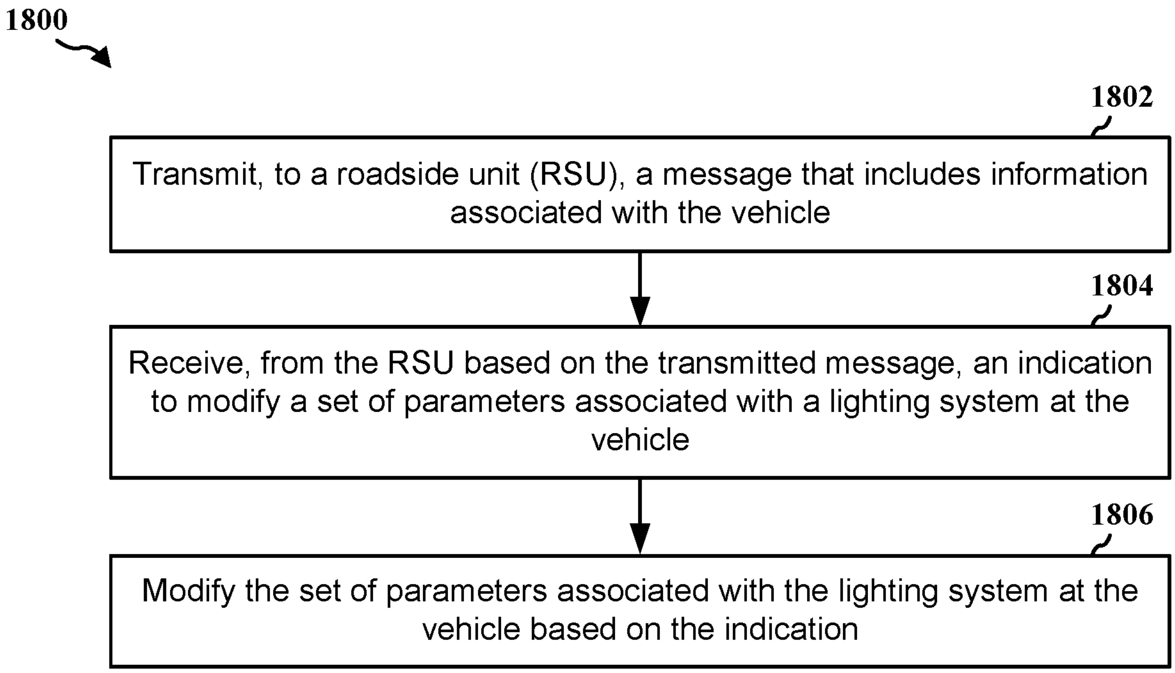
FIG. 18 is a flowchart of a method of wireless communication.

FIG. 18 is a flowchart 1800 of a method of wireless communication. The method may be performed by an on-board unit (OBU) on a vehicle (e.g., the UE 104, 404, 502. 504, 506, 508; the first vehicle 902, 1002, 1102, 1202, 1302, 1402; the second vehicle 904, 1004, 1304, 1404; the third vehicle 1306, 1406; the apparatus 1904). The method may enable the OBU to adjust headlight beams of the vehicle with the assistance of at least one RSU.

At 1802, the OBU may transmit, to an RSU, a message that includes information associated with the vehicle, such as described in connection with FIGS. 9 to 14. For example, as shown at 930 of FIG. 9, the first vehicle 902 may transmit a message 912 to the RSU 906, where the message 912 may include information related to the first vehicle 902, such as the speed, the heading, the location, the car dimension, and/or the vehicle type of the first vehicle 902. The transmission of the message may be performed by, e.g., the light configuration component 198, the transceiver(s) 1922, the cellular baseband processor(s) 1924, and/or the application processor(s) 1906 of the apparatus 1904 in FIG. 19.

At 1804, the OBU may receive, from the RSU based on the transmitted message, an indication to modify a set of parameters associated with a lighting system at the vehicle, such as described in connection with FIGS. 9 to 14. For example, as shown at 934 of FIG. 9, the first vehicle 902 may receive a unicast message 916 or a broadcast message 918 from the RSU 906 to indicate the first vehicle 902 to switch from high beam(s) to low beam(s). The reception of the indication may be performed by, e.g., the light configuration component 198, the transceiver(s) 1922, the cellular baseband processor(s) 1924, and/or the application processor(s) 1906 of the apparatus 1904 in FIG. 19.

At 1806, the OBU may modify the set of parameters associated with the lighting system at the vehicle based on the indication, such as described in connection with FIGS. 9 to 14. For example, as shown at 936 of FIG. 9, the first vehicle 902 may switch from high beam(s) to low beam(s) based on the unicast message 916 and/or the broadcast message 918. The modification of the set of parameters associated with the lighting system may be performed by, e.g., the light configuration component 198, the transceiver(s) 1922, the cellular baseband processor(s) 1924, and/or the application processor(s) 1906 of the apparatus 1904 in FIG. 19.

In one example, to receive the indication, the OBU may receive the indication via unicast or multicast.

In another example, the message may be a BSM, an ITS message, a CAM message, or a DENM message.

In another example, the lighting system may include one or more headlight beams or one or more fog light beams. In some implementations, the indication to modify may include an instruction to adjust an intensity or a light range of at least one of: the one or more headlight beams or the one or more fog light beams.

In another example, the information may include at least one of: a speed, a heading direction, a location, beam information, or dimension information of the vehicle.

In another example, the indication may further specify at least one of a time, a distance, or a location to modify the set of parameters. In some implementations, to modify the set of parameters, the OBU may modify the set of parameters at the time, the distance, or the location specified.

Figure 19:
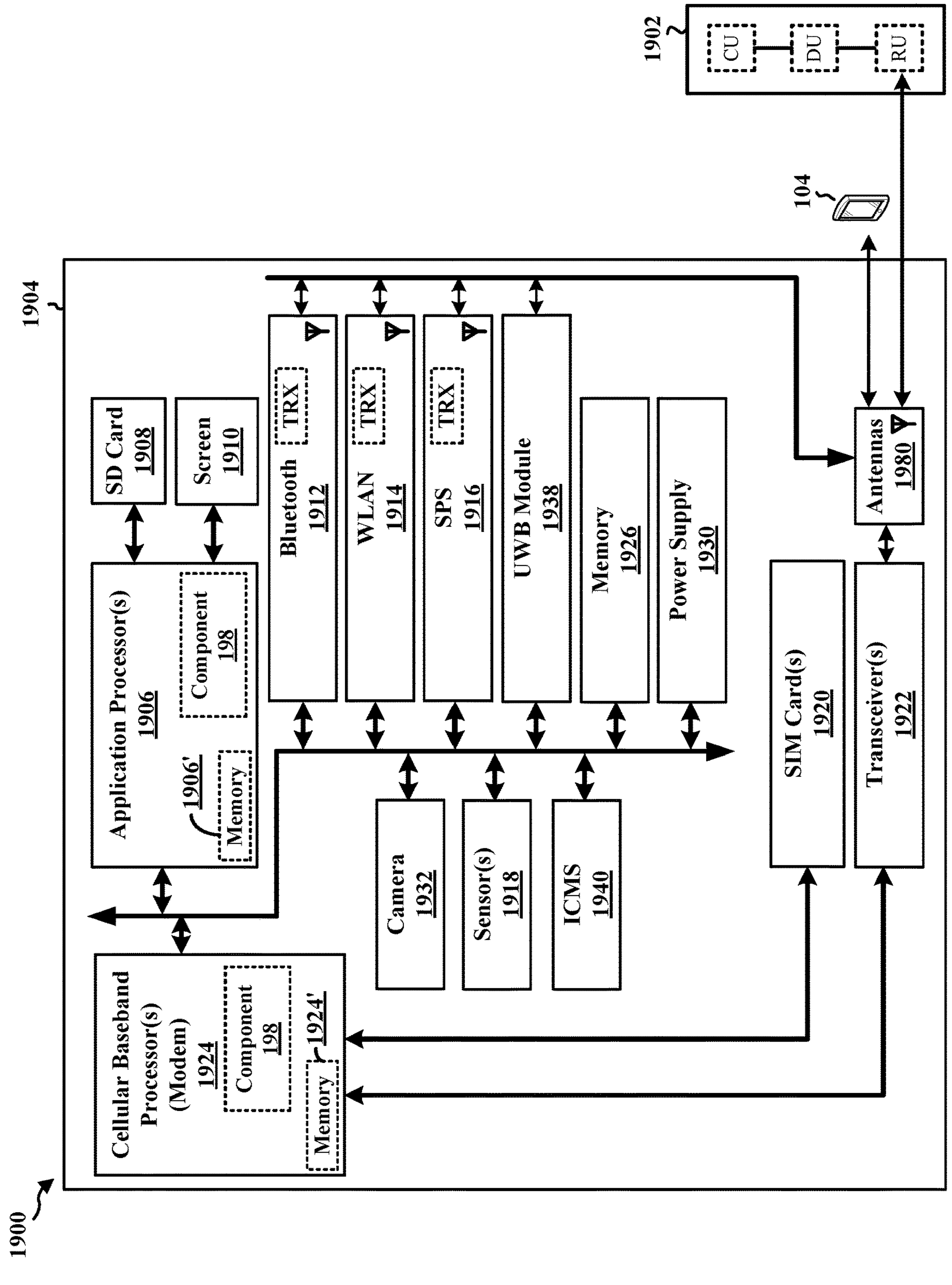
FIG. 19 is a diagram illustrating an example of a hardware implementation for an example apparatus and/or network entity.

FIG. 19 is a diagram 1900 illustrating an example of a hardware implementation for an apparatus 1904. The apparatus 1904 may be a UE, a component of a UE, or may implement UE functionality. In some aspects, the apparatus 1904 may include at least one cellular baseband processor 1924 (also referred to as a modem) coupled to one or more transceivers 1922 (e.g., cellular RF transceiver). The cellular baseband processor(s) 1924 may include at least one on-chip memory 1924'. In some aspects, the apparatus 1904 may further include one or more subscriber identity modules (SIM) cards 1920 and at least one application processor 1906 coupled to a secure digital (SD) card 1908 and a screen 1910. The application processor(s) 1906 may include on-chip memory 1906'. In some aspects, the apparatus 1904 may further include a Bluetooth module 1912, a WLAN module 1914, an ultrawide band (UWB) module 1938, an ICMS 1940, an SPS module 1916 (e.g., GNSS module), one or more sensors 1918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1926, a power supply 1930, and/or a camera 1932. The Bluetooth module 1912, the UWB module 1938, the ICMS 1940, the WLAN module 1914, and the SPS module 1916 may include an on-chip transceiver (TRX) (or in some cases, just a receiver (RX)). The Bluetooth module 1912, the WLAN module 1914, and the SPS module 1916 may include their own dedicated antennas and/or utilize the antennas 1980 for communication. The cellular baseband processor(s) 1924 communicates through the transceiver(s) 1922 via one or more antennas 1980 with the UE 104 and/or with an RU associated with a network entity 1902. The cellular baseband processor(s) 1924 and the application processor(s) 1906 may each include a computer-readable medium/memory 1924', 1906', respectively. The additional memory modules 1926 may also be considered a computer-readable medium/memory. Each computer-readable medium/memory 1924', 1906', 1926 may be non-transitory. The cellular baseband processor(s) 1924 and the application processor(s) 1906 are each responsible for general processing, including the execution of software stored on the computer-readable medium/memory. The software, when executed by the cellular baseband processor(s) 1924/application processor(s) 1906, causes the cellular baseband processor(s) 1924/application processor(s) 1906 to perform the various functions described supra. The cellular baseband processor(s) 1924 and the application processor(s) 1906 are configured to perform the various functions described supra based at least in part of the information stored in the memory. That is, the cellular baseband processor(s) 1924 and the application processor(s) 1906 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1924/application processor(s) 1906 when executing software. The cellular baseband processor(s) 1924/application processor(s) 1906 may be a component of the UE 350 and may include the at least one memory 360 and/or at least one of the TX processor 368, the RX processor 356, and the controller/processor 359. In one configuration, the apparatus 1904 may be at least one processor chip (modem and/or application) and include just the cellular baseband processor(s) 1924 and/or the application processor(s) 1906, and in another configuration, the apparatus 1904 may be the entire UE (e.g., see UE 350 of FIG. 3) and include the additional modules of the apparatus 1904.

As discussed supra, the light configuration component 198 may be configured to transmit, to an RSU, a message that includes information associated with the vehicle. The light configuration component 198 may also be configured to receive, from the RSU based on the transmitted message, an indication to modify a set of parameters associated with a lighting system at the vehicle. The light configuration component 198 may also be configured to modify the set of parameters associated with the lighting system at the vehicle based on the indication. The light configuration component 198 may be within the cellular baseband processor(s) 1924, the application processor(s) 1906, or both the cellular baseband processor(s) 1924 and the application processor(s) 1906. The light configuration component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1904 may include a variety of components configured for various functions. In one configuration, the apparatus 1904, and in particular the cellular baseband processor(s) 1924 and/or the application processor(s) 1906, may include means for transmitting, to an RSU, a message that includes information associated with the vehicle. The apparatus 1904 may further include means for receiving, from the RSU based on the transmitted message, an indication to modify a set of parameters associated with a lighting system at the vehicle. The apparatus 1904 may further include means for modifying the set of parameters associated with the lighting system at the vehicle based on the indication.

In one configuration, the means for receiving the indication may include configuring the apparatus 1904 to receive the indication via unicast or multicast.

In another configuration, the message may be a BSM, an ITS message, a CAM message, or a DENM message.

In another configuration, the lighting system may include one or more headlight beams or one or more fog light beams. In some implementations, the indication to modify may include an instruction to adjust an intensity or a light range of at least one of: the one or more headlight beams or the one or more fog light beams.

In another configuration, the information may include at least one of: a speed, a heading direction, a location, beam information, or dimension information of the vehicle.

In another configuration, the indication may further specify at least one of a time, a distance, or a location to modify the set of parameters. In some implementations, the means for modifying the set of parameters may include configuring the apparatus 1904 to modify the set of parameters at the time, the distance, or the location specified.

The means may be the light configuration component 198 of the apparatus 1904 configured to perform the functions recited by the means. As described supra, the apparatus 1904 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a roadside unit (RSU), comprising: receiving at least one of a first message that includes first information associated with a first vehicle or a second message that includes second information associated with a second vehicle; and transmitting, based on at least one of the first message or the second message, an indication to modify at least one of a first set of parameters associated with a first lighting system at the first vehicle or a second set of parameters associated with a second lighting system at the second vehicle.

Aspect 2 is the method of aspect 1, wherein transmitting the indication comprises: transmitting the indication to at least one of the first vehicle, the second vehicle, or a second RSU via unicast or multicast.

Aspect 3 is the method of aspect 1 or aspect 2, wherein the first message is a first basic safety message (BSM), a first intelligent transport system (ITS) message, a first cooperative awareness message (CAM) message, or a first decentralized environmental notification messages (DENM) message, and wherein the second message is a second BSM, a second ITS message, a second CAM message, or a second DENM message.

Aspect 4 is the method of any of aspects 1 to 3, wherein the first lighting system includes one or more first headlight beams or one or more first fog light beams, and wherein the second lighting system includes one or more second headlight beams or one or more second fog light beams.

Aspect 5 is the method of any of aspects 1 to 4, wherein the indication to modify includes an instruction to adjust an intensity or a light range of at least one of: the one or more first headlight beams, the one or more first fog light beams, the one or more second headlight beams, or the one or more second fog light beams.

Aspect 6 is the method of any of aspects 1 to 5, wherein the first information includes at least one of: a first speed, a first heading direction, a first location, first beam information, or first dimension information of the first vehicle, and wherein the second information includes at least one of: a second speed, a second heading direction, a second location, second beam information, or second dimension information of the second vehicle.

Aspect 7 is the method of any of aspects 1 to 6, wherein receiving the first message comprises receiving the first message from the first vehicle or a second RSU, and wherein receiving the second message comprises receiving the second message from the second vehicle or the second RSU.

Aspect 8 is the method of any of aspects 1 to 7, further comprising: identifying that the first vehicle and the second vehicle are within a threshold distance of each other based on the first information and the second information, and wherein transmitting the indication to modify comprises transmitting the indication to modify further based on the identification that the first vehicle and the second vehicle are within the threshold distance of each other.

Aspect 9 is the method of any of aspects 1 to 8, wherein identifying that the first vehicle and the second vehicle are within the threshold distance of each other comprises: identifying that the first vehicle and the second vehicle are approaching each other or identifying that the first vehicle and the second vehicle are traveling in a same direction as each other.

Aspect 10 is the method of any of aspects 1 to 9, wherein the indication further includes a time, a distance, or a location for at least one of the first vehicle or the second vehicle to modify at least one of the first set of parameters or the second set of parameters.

Aspect 11 is the method of any of aspects 1 to 10, further comprising: obtaining third information associated with a third vehicle or a pedestrian, wherein transmitting the indication to modify comprises transmitting the indication to modify further based on the third information, and wherein the third information includes at least one of: a third speed, a third heading direction, a third location, third beam information, or third dimension information of the third vehicle or the pedestrian.

Aspect 12 is the method of any of aspects 1 to 11, wherein obtaining the third information associated with the third vehicle or the pedestrian comprises: obtaining the third information associated with the third vehicle using at least one of a camera, a sensor, a radar of the RSU, or a radar from a second RSU.

Aspect 13 is the method of any of aspects 1 to 12, further comprising: receiving, from at least one of the first vehicle or the second vehicle, third information associated with a third vehicle, wherein transmitting the indication to modify comprises transmitting the indication to modify further based on the third information associated with the third vehicle.

Aspect 14 is an apparatus for wireless communication at a roadside unit (RSU), including: at least one memory; and at least one processor coupled to the at least one memory and, based at least in part on information stored in the at least one memory, the at least one processor, individually or in any combination, is configured to implement any of aspects 1 to 13.

Aspect 15 is the apparatus of aspect 14, further including at least one of a transceiver or an antenna coupled to the at least one processor.

Aspect 16 is an apparatus for wireless communication including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

Aspect 18 is a method of wireless communication at an on-board unit (OBU) on a vehicle, comprising: transmitting, a message that includes information associated with the vehicle; receiving, based on the transmitted message, an indication to modify a set of parameters associated with a lighting system at the vehicle; and modifying the set of parameters associated with the lighting system at the vehicle based on the indication.

Aspect 19 is the method of aspect 18, wherein receiving the indication comprises: receiving the indication from a roadside unit (RSU) via unicast or multicast.

Aspect 20 is the method of aspect 18 or aspect 19, wherein the message is a basic safety message (BSM), an intelligent transport system (ITS) message, a cooperative awareness message (CAM) message, or a decentralized environmental notification messages (DENM) message.

Aspect 21 is the method of any of aspects 18 to 20, wherein the lighting system includes one or more headlight beams or one or more fog light beams.

Aspect 22 is the method of any of aspects 18 to 21, wherein the indication to modify includes an instruction to adjust an intensity or a light range of at least one of: the one or more headlight beams or the one or more fog light beams.

Aspect 23 is the method of any of aspects 18 to 22, wherein the information includes at least one of: a speed, a heading direction, a location, beam information, or dimension information of the vehicle.

Aspect 24 is the method of any of aspects 18 to 23, wherein the indication further specifies at least one of a time, a distance, or a location to modify the set of parameters.

Aspect 25 is the method of any of aspects 18 to 24, wherein modifying the set of parameters comprises modifying the set of parameters at the time, the distance, or the location specified.

Aspect 26 is the method of any of aspects 18 to 25, further comprising: determining whether a reception of a set of global navigation satellite system (GNSS) signals at the vehicle is above a threshold, wherein the modification of the set of parameters is further based on the reception of the set of GNSS signals at the vehicle being above the threshold.

Aspect 27 is an apparatus for wireless communication at an on-board unit (OBU) on a vehicle, including: at least one memory; and at least one processor coupled to the at least one memory and, based at least in part on information stored in the at least one memory, the at least one processor, individually or in any combination, is configured to implement any of aspects 18 to 26.

Aspect 28 is the apparatus of aspect 27, further including at least one of a transceiver or an antenna coupled to the at least one processor.

Aspect 29 is an apparatus for wireless communication including means for implementing any of aspects 18 to 26.

Aspect 30 is a computer-readable medium (e.g., a non-transitory computer-readable medium) storing computer executable code, where the code when executed by a processor causes the processor to implement any of aspects 18 to 26.

What is claimed is:

1. An apparatus for wireless communication at a roadside unit (RSU), comprising:

at least one memory;

at least one transceiver; and at least one processor coupled to the at least one memory and the at least one transceiver, the at least one processor, individually or in any combination, is configured to:

receive, via the at least one transceiver, at least one of a first message that includes first information associated with a first vehicle or a second message that includes second information associated with a second vehicle; and transmit, via the at least one transceiver, based on at least one of the first message or the second message, an indication to modify at least one of a first set of parameters associated with a first lighting system at the first vehicle or a second set of parameters associated with a second lighting system at the second vehicle.

2. The apparatus of claim 1, wherein to transmit the indication, the at least one processor, individually or in any combination, is configured to:

transmit the indication to at least one of the first vehicle, the second vehicle, or a second RSU via unicast or multicast.

3. The apparatus of claim 1, wherein the first message is a first basic safety message (BSM), a first intelligent transport system (ITS) message, a first cooperative awareness message (CAM) message, or a first decentralized environmental notification messages (DENM) message, and wherein the second message is a second BSM, a second ITS message, a second CAM message, or a second DENM message.

4. The apparatus of claim 1, wherein the first lighting system includes one or more first headlight beams or one or more first fog light beams, and wherein the second lighting system includes one or more second headlight beams or one or more second fog light beams.

5. The apparatus of claim 4, wherein the indication to modify includes an instruction to adjust an intensity or a light range of at least one of: the one or more first headlight beams, the one or more first fog light beams, the one or more second headlight beams, or the one or more second fog light beams.

6. The apparatus of claim 1, wherein the first information includes at least one of: a first speed, a first heading direction, a first location, first beam information, or first dimension information of the first vehicle, and wherein the second information includes at least one of: a second speed, a second heading direction, a second location, second beam information, or second dimension information of the second vehicle.

7. The apparatus of claim 1, wherein to receive the first message, the at least one processor, individually or in any combination, is configured to receive the first message from the first vehicle or a second RSU, and wherein to receive the second message, the at least one processor, individually or in any combination, is configured to receive the second message from the second vehicle or the second RSU.

8. The apparatus of claim 1, wherein the at least one processor, individually or in any combination, is further configured to:

identify that the first vehicle and the second vehicle are within a threshold distance of each other based on the first information and the second information, and wherein to transmit the indication to modify, the at least one processor, individually or in any combination, is configured to transmit the indication to modify further based on the identification that the first vehicle and the second vehicle are within the threshold distance of each other.

9. The apparatus of claim 8, wherein to identify that the first vehicle and the second vehicle are within the threshold distance of each other, the at least one processor, individually or in any combination, is configured to:

identify that the first vehicle and the second vehicle are approaching each other or identify that the first vehicle and the second vehicle are traveling in a same direction as each other.

10. The apparatus of claim 1, wherein the indication further includes a time, a distance, or a location for at least one of the first vehicle or the second vehicle to modify at least one of the first set of parameters or the second set of parameters.

11. The apparatus of claim 1, wherein the at least one processor, individually or in any combination, is further configured to:

obtain third information associated with a third vehicle or a pedestrian, wherein to transmit the indication to modify, the at least one processor, individually or in any combination, is configured to transmit the indication to modify further based on the third information, and wherein the third information includes at least one of: a third speed, a third heading direction, a third location, third beam information, or third dimension information of the third vehicle or the pedestrian.

12. The apparatus of claim 11, wherein to obtain the third information associated with the third vehicle or the pedestrian, the at least one processor, individually or in any combination, is configured to:

obtain the third information associated with the third vehicle using at least one of a camera, a sensor, a radar of the RSU, or a second radar from a second RSU.

13. The apparatus of claim 1, wherein the at least one processor, individually or in any combination, is further configured to:

receive, from at least one of the first vehicle or the second vehicle, third information associated with a third vehicle, wherein to transmit the indication to modify, the at least one processor, individually or in any combination, is configured to transmit the indication to modify further based on the third information associated with the third vehicle.

14. A method of wireless communication at a roadside unit (RSU), comprising:

receiving at least one of a first message that includes first information associated with a first vehicle or a second message that includes second information associated with a second vehicle; and transmitting, based on at least one of the first message or the second message, an indication to modify at least one of a first set of parameters associated with a first lighting system at the first vehicle or a second set of parameters associated with a second lighting system at the second vehicle.

15. The method of claim 14, further comprising:

identifying that the first vehicle and the second vehicle are within a threshold distance of each other based on the first information and the second information, and wherein transmitting the indication to modify comprises transmitting the indication to modify further based on the identification that the first vehicle and the second vehicle are within the threshold distance of each other.

16. The method of claim 14, further comprising:

obtaining third information associated with a third vehicle or a pedestrian, wherein transmitting the indication to modify comprises transmitting the indication to modify further based on the third information, and wherein the third information includes at least one of: a third speed, a third heading direction, a third location, third beam information, or third dimension information of the third vehicle or the pedestrian.

17. The method of claim 14, further comprising:

receiving, from at least one of the first vehicle or the second vehicle, third information associated with a third vehicle, wherein transmitting the indication to modify comprises transmitting the indication to modify further based on the third information associated with the third vehicle.

18. An apparatus for wireless communication at a vehicle, comprising:

at least one memory;

at least one transceiver; and at least one processor coupled to the at least one memory and the at least one transceiver, the at least one processor, individually or in any combination, is configured to:

transmit, via the at least one transceiver, to a roadside unit (RSU), a message that includes information associated with the vehicle;

receive, via the at least one transceiver, from the RSU based on the transmitted message, an indication to modify a set of parameters associated with a lighting system at the vehicle; and modify the set of parameters associated with the lighting system at the vehicle based on the indication.

19. The apparatus of claim 18, wherein to receive the indication, the at least one processor, individually or in any combination, is configured to:

receive the indication via unicast or multicast.

20. The apparatus of claim 18, wherein the message is a basic safety message (BSM), an intelligent transport system (ITS) message, a cooperative awareness message (CAM) message, or a decentralized environmental notification messages (DENM) message.

21. The apparatus of claim 18, wherein the lighting system includes one or more headlight beams or one or more fog light beams.

22. The apparatus of claim 21, wherein the indication to modify includes an instruction to adjust an intensity or a light range of at least one of: the one or more headlight beams or the one or more fog light beams.

23. The apparatus of claim 18, wherein the information includes at least one of: a speed, a heading direction, a location, beam information, or dimension information of the vehicle.

24. The apparatus of claim 18, wherein the indication further specifies at least one of a time, a distance, or a location to modify the set of parameters.

25. The apparatus of claim 24, wherein to modify the set of parameters, the at least one processor, individually or in any combination, is configured to:

modify the set of parameters at the time, the distance, or the location specified.

26. A method of wireless communication at a vehicle, comprising:

transmitting, to a roadside unit (RSU), a message that includes information associated with the vehicle;

receiving, from the RSU based on the transmitted message, an indication to modify a set of parameters associated with a lighting system at the vehicle; and modifying the set of parameters associated with the lighting system at the vehicle based on the indication.

27. The method of claim 26, wherein the message is a basic safety message (BSM), an intelligent transport system (ITS) message, a cooperative awareness message (CAM) message, or a decentralized environmental notification messages (DENM) message.

28. The method of claim 26, wherein the lighting system includes one or more headlight beams or one or more fog light beams, and wherein the indication to modify includes an instruction to adjust an intensity or a light range of at least one of: the one or more headlight beams or the one or more fog light beams.

29. The method of claim 26, wherein the information includes at least one of: a speed, a heading direction, a location, beam information, or dimension information of the vehicle.

30. The method of claim 26, wherein the indication further specifies at least one of a time, a distance, or a location to modify the set of parameters, and wherein modifying the set of parameters comprises:

modifying the set of parameters at the time, the distance, or the location specified.

* * * * *